(12) United States Patent
Ninomiya et al.

(10) Patent No.: US 11,372,390 B2
(45) Date of Patent: Jun. 28, 2022

(54) SYSTEM, METHOD, AND PROGRAM FOR MANUFACTURING COMPUTER-DESIGNED PART MEMBERS OF FURNITURE USING MACHINING EQUIPMENT

(71) Applicant: DOMANS, INC., Tokyo (JP)

(72) Inventors: Kenichi Ninomiya, Tokyo (JP); Seiji Yokoyama, Tokyo (JP); Shunichiro Yumigeta, Tokyo (JP)

(73) Assignee: DOMANS, INC., Tokyo (JP)

( * ) Notice: Subject to any disclaimer, the term of this patent is extended or adjusted under 35 U.S.C. 154(b) by 88 days.

(21) Appl. No.: 16/634,519

(22) PCT Filed: Jul. 27, 2018

(86) PCT No.: PCT/JP2018/028204
§ 371 (c)(1),
(2) Date: Feb. 19, 2020

(87) PCT Pub. No.: WO2019/022221
PCT Pub. Date: Jan. 31, 2019

(65) Prior Publication Data
US 2020/0174439 A1 Jun. 4, 2020

(30) Foreign Application Priority Data

Jul. 28, 2017 (JP) .............................. JP2017-147205

(51) Int. Cl.
*G05B 19/402* (2006.01)
*G05B 19/18* (2006.01)
(52) U.S. Cl.
CPC ......... *G05B 19/182* (2013.01); *G05B 19/402* (2013.01); *G05B 2219/49001* (2013.01)
(58) Field of Classification Search
None
See application file for complete search history.

(56) References Cited

U.S. PATENT DOCUMENTS 5,993,042 A * 11/1999 Matsubara ......... G05B 19/4099
700/118
6,907,312 B2 * 6/2005 Sagawa .............. G05B 19/4093
483/11
(Continued)

FOREIGN PATENT DOCUMENTS

JP 10162048 A 6/1998
JP 2007164576 A 6/2007
(Continued)

OTHER PUBLICATIONS

International Search Report for PCT/JP2017/003324 dated May 9, 2017, 2 pages.

(Continued)

*Primary Examiner* — Jennifer L Norton
(74) *Attorney, Agent, or Firm* — Liang Legal Group, PLLC

(57) ABSTRACT

A furniture product is designed as a rectangular parallelepiped space such that dimension of the space can be altered. Shape and size of a plurality of kinds of machining to be provided on a face of a part member face is registered in a machining master. Toolpath of controlling a tool of a machining machine is produced by CAM for each machining in advance. Machining selected from the machining master is registered on a face of a rectangular parallelepiped space of the part member. Upon receiving the data of rectangular parallelepiped space of the part member having altered dimension, the machining machine can apply the selected machining at a position after alteration of the dimension by controlling the tool in accordance with the toolpath.

9 Claims, 21 Drawing Sheets

(56) References Cited

U.S. PATENT DOCUMENTS

| | | |
|---|---|---|
| 7,016,747 B1 | 3/2006 | Ninomiya |
| 7,884,818 B2 | 2/2011 | Ninomiya |
| 10,713,395 B2* | 7/2020 | Ninomiya ............... G06T 19/20 |
| 2007/0262982 A1 | 11/2007 | Ninomiya |
| 2008/0222568 A1 | 9/2008 | Okuwaki et al. |
| 2013/0201189 A1 | 8/2013 | Saal et al. |
| 2016/0070255 A1* | 3/2016 | Loberg ............... G05B 19/4097 |
| | | 700/98 |
| 2017/0046776 A1* | 2/2017 | Ninomiya .......... G06Q 30/0633 |
| 2018/0089336 A1 | 3/2018 | Ninomiya et al. |
| 2020/0096978 A1* | 3/2020 | Baker .............. G05B 19/41865 |

FOREIGN PATENT DOCUMENTS

| | | |
|---|---|---|
| JP | 2007164578 A | 6/2007 |
| WO | 2006064971 A1 | 6/2006 |

OTHER PUBLICATIONS

Non-Final Office Action for U.S. Appl. No. 15/572,061 dated Jan. 27, 2020, 14 pages.

* cited by examiner

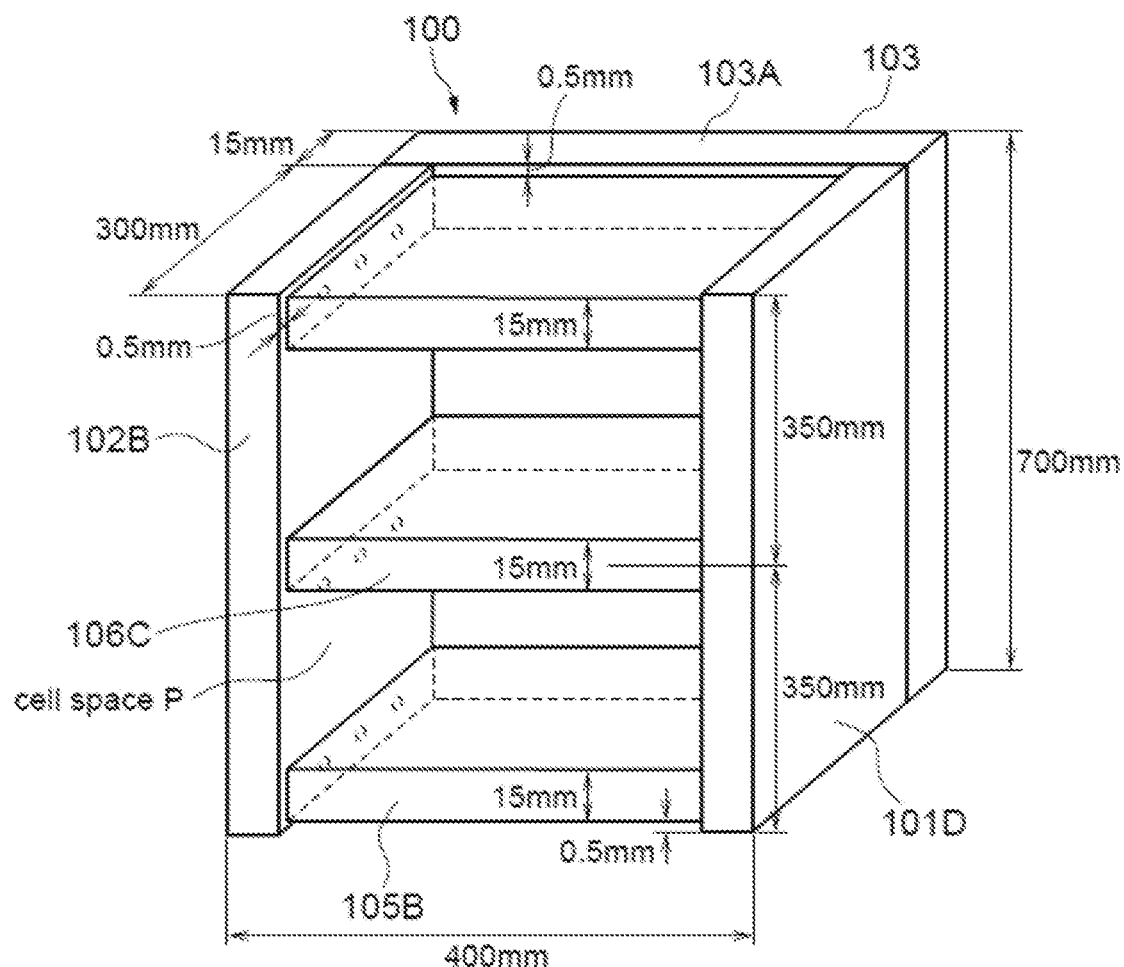
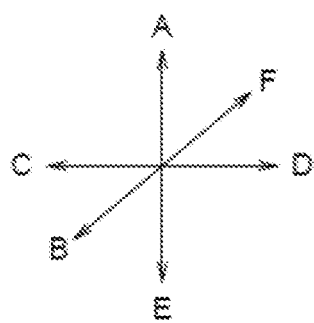
FIG. 6

|   | face 1 | | face 2 | | distance | face 2 correlation to face 1 |
|---|---|---|---|---|---|---|
| 1 | left side panel 102 | right side face 102D | top panel 104 | left side face 104C | 0 | bottom panel |
| 2 | left side panel 102 | right side face 102D | base panel 105 | left side face 105C | 0 | bottom panel |
| 3 | left side panel 102 | left side face 102C | back panel 103 | left side face 103C | 0 | bottom panel |
| 4 | left side panel 102 | front face 102B | right side panel 101 | front face 101B | 0 | bottom panel |
| 5 | left side panel 102 | front face 102B | top panel 104 | front face 104B | 0.5mm | separated |
| 6 | left side panel 102 | front face 102B | base panel 105 | front face 105B | 0.5mm | separated |
| 7 | left side panel 102 | rear face 102F | right side panel 101 | rear face 101F | 0 | bottom panel |
| 8 | left side panel 102 | rear face 102F | top panel 104 | rear face 104F | 0 | bottom panel |
| 9 | left side panel 102 | rear face 102F | base panel 105 | rear face 105F | 0 | bottom panel |
| 10 | left side panel 102 | rear face 102F | back panel 103 | front face 103B | 0 | bottom panel |
| 11 | left side panel 102 | upper face 102A | top panel 104 | upper face 104A | 0.5mm | separated |
| 12 | left side panel 102 | upper face 102A | right side panel 101 | upper face 101A | 0 | bottom panel |
| 13 | left side panel 102 | lower face 102E | base panel 105 | lower face 105E | 0.5mm | separated |
| 14 | left side panel 102 | lower face 102E | right side panel 101 | lower face 101E | 0 | bottom panel |
| 15 | left side panel 102 | upper face 102A | back panel 103 | upper face 103A | 0 | bottom panel |
| 16 | left side panel 102 | lower face 102E | back panel 103 | lower face 103E | 0 | bottom panel |
| 17 | right side panel 101 | left side face 101C | top panel 104 | right side face 104D | 0 | bottom panel |
| 18 | right side panel 101 | left side face 101C | base panel 105 | right side face 105D | 0 | bottom panel |
| 19 | right side panel 101 | right side face 101D | back panel 103 | right side face 103D | 0 | bottom panel |

FIG. 8

|   | face 1 | face 2 | distance |
|---|---|---|---|
| 1 | unit space upper face (face A) | left side panel upper face 102A | 0 |
| 2 | unit space lower face (face E) | left side panel lower face 102E | 0 |
| 3 | unit space left face (face C) | left side panel left face 102C | 0 |
| 4 | unit space right face (face D) | right side panel right face 101D | 0 |
| 5 | unit space front face (face B) | left side panel front face 102B | 0 |
| 6 | unit space rear face (face F) | back panel rear face 103F | 0 |

FIG. 9 bill of materials (BOM data)

| product ID | unit ID | part member ID | part member name | material | length | width | thickness | number |
|---|---|---|---|---|---|---|---|---|
| 001 | 1 | 102 | left side panel | solid wood | 300mm | 690mm | 15mm | 1 |
| 001 | 1 | 102 | left side panel | solid wood | 300mm | 690mm | 15mm | 1 |
| 001 | 1 | 101 | right side panel | solid wood | 300mm | 690mm | 15mm | 1 |
| 001 | 1 | 101 | right side panel | solid wood | 300mm | 690mm | 15mm | 1 |
| 001 | 1 | 104 | top panel 1 | solid wood | 370mm | 299.5mm | 15mm | 1 |
| 001 | 1 | 104 | top panel 1 | solid wood | 370mm | 299.5mm | 15mm | 1 |
| 001 | 1 | 105 | base panel | solid wood | 370mm | 299.5mm | 15mm | 1 |
| 001 | 1 | 105 | base panel 1 | solid wood | 370mm | 299.5mm | 15mm | 1 |
| 001 | 1 | 103 | back panel | solid wood | 400mm | 690mm | 15mm | 1 |
| 001 | 1 | 103 | back panel | solid wood | 400mm | 690mm | 15mm | 1 |
| 001 | 2 | 106 | movable shelf | core component | 369mm | 285mm | 15mm | 1 |
| 001 | 2 | 106 | movable shelf | surface sheet | 367mm | 297.5mm | 15mm | 1 |
| 001 | 2 | 106 | movable shelf | surface sheet | 369mm | 284mm | 1mm | 2 |
| 001 | 2 | 106 | movable shelf | butt end sheet | 289mm | 15mm | 1mm | 2 |
| 001 | 2 | 107 | dowel | | 6mm | 8mm | 1mm | 18 |

FIG. 14 machining specification of left side panel 102 Fig.6

| hole | face number | machining type | X | Y | depth | diameter | |
|---|---|---|---|---|---|---|---|
| a' | 102D | drilling | 30.5mm | 692.0mm | 8mm | 6mm | transfer from 104C of a |
| b' | 102D | drilling | 150.25mm | 692.0mm | 8mm | 6mm | transfer from 104C of b |
| c' | 102D | drilling | 270mm | 692.0mm | 8mm | 6mm | transfer from 104C of c |
| g" | 102D | drilling | 30.5mm | 339.5mm | 8mm | 6mm | transfer from 106C of g |
| h" | 102D | drilling | 150.25mm | 339.5mm | 8mm | 6mm | transfer from 106C of h |
| i" | 102D | drilling | 270mm | 339.5mm | 8mm | 6mm | transfer from 106C of i |
| d' | 102D | drilling | 30.5mm | 8.0mm | 8mm | 6mm | transfer from 105C of d |
| e' | 102D | drilling | 150.25mm | 8.0mm | 8mm | 6mm | transfer from 105C of e |
| f' | 102D | drilling | 270mm | 8.0mm | 8mm | 6mm | transfer from 105C of f |

FIG. 15A machining specification of dowel hole on left side panel 102 figure 12 height 700mm→690mm

| hole | face number | machining type | X | Y | depth | diameter | |
|---|---|---|---|---|---|---|---|
| a' | 102D | drilling | 30.5mm | 682.0mm | 8mm | 6mm | transfer from 104C of a |
| b' | 102D | drilling | 150.25mm | 682.0mm | 8mm | 6mm | transfer from 104C of b |
| c' | 102D | drilling | 270mm | 682.0mm | 8mm | 6mm | transfer from 104C of c |
| g" | 102D | drilling | 30.5mm | 334.5mm | 8mm | 6mm | transfer from 106C of g |
| h" | 102D | drilling | 150.25mm | 334.5mm | 8mm | 6mm | transfer from 106C of h |
| i" | 102D | drilling | 270mm | 334.5mm | 8mm | 6mm | transfer from 106C of i |
| d' | 102D | drilling | 30.5mm | 8.0mm | 8mm | 6mm | transfer from 105C of d |
| e' | 102D | drilling | 150.25mm | 8.0mm | 8mm | 6mm | transfer from 105C of e |
| f' | 102D | drilling | 270mm | 8.0mm | 8mm | 6mm | transfer from 105C of f |

FIG. 15B machining specification of dowel hole on left side panel 102 figure 13 shelf panel 10mm lower

| hole | face number | machining type | X | Y | depth | diameter | |
|---|---|---|---|---|---|---|---|
| a' | 102D | drilling | 30.5mm | 692.0mm | 8mm | 6mm | transfer from 104C of a |
| b' | 102D | drilling | 150.25mm | 692.0mm | 8mm | 6mm | transfer from 104C of b |
| c' | 102D | drilling | 270mm | 692.0mm | 8mm | 6mm | transfer from 104C of c |
| g" | 102D | drilling | 30.5mm | 329.5mm | 8mm | 6mm | transfer from 106C of g |
| h" | 102D | drilling | 150.25mm | 329.5mm | 8mm | 6mm | transfer from 106C of h |
| i" | 102D | drilling | 270mm | 329.5mm | 8mm | 6mm | transfer from 106C of i |
| d' | 102D | drilling | 30.5mm | 8.0mm | 8mm | 6mm | transfer from 105C of d |
| e' | 102D | drilling | 150.25mm | 8.0mm | 8mm | 6mm | transfer from 105C of e |
| f' | 102D | drilling | 270mm | 8.0mm | 8mm | 6mm | transfer from 105C of f |

FIG. 15C

|   |   | A Factory | B Factory |
|---|---|---|---|
| A | diameter 8mm | NC | NC |
| B | 5mm | cup hole | NC |
| C | 30mm |  | NC |
| D | 70 × 20mm | corner cutting | corner cutting |
| E | 3mm × 6mm width depth | tenoner | NC |
| F | through hole ⌀50mm | NC | NC | machining master

| | machining | diameter | depth | reference position |
|---|---|---|---|---|
| #7 | cup hole | 35mm | 10mm | center of cup hole |
| #8 | hinge driving hole | 2.5mm | 10mm | center of hinge driving hole |
| #9 | hinge machining holes | mchining name | 10mm | center of cup hole | machining position

| machining | X | Y |
|---|---|---|
| #7 | 68mm | 22.5mm |
| #8 | 45.5mm | 40mm |
| #8 | 90.5mm | 40mm |
| #7 | 673mm | 22.5mm |
| #8 | 650.5mm | 40mm |
| #8 | 695.5mm | 40mm |
| #9 | 68mm | 22.5mm |
| #9 | 673mm | 22.5mm | drawer front panel grooving machining machining master

| | machining | X(width) | Y(depth) | Z(height) | reference position |
|---|---|---|---|---|---|
| #10 | groove for line handle | 813mm | 8mm | 15mm | upper left corner of groove | machining position

| machining | X(width) | Y(depth) |
|---|---|---|
| #10 | 0 | 0 |

SYSTEM, METHOD, AND PROGRAM FOR MANUFACTURING COMPUTER-DESIGNED PART MEMBERS OF FURNITURE USING MACHINING EQUIPMENT

FIELD OF INVENTION

The present specification relates to a method, a system, and a program thereof for designing a part member of a furniture product such that the part member can be customized using a computer and manufacturing the part member having altered dimensions by using a machining device.

BACKGROUND ART

In general, storage furniture products (book shelve, cabinet, etc.) are manufactured by combining a plurality of part members made of panels that have been machined such as drilling and grooving. Currently, furniture products and part members that constitute a furniture product are often designed on a computer display screen using CAD rather than handwriting drawings.

Computer Aided Design (CAD) and Computer Aided Manufacturing (CAM) is used to design a part of a furniture product using a computer to manufacture the part by using a machining device such as Numerical Control (NC) machine. In CAD/CAM, the part data is drawn in CAD and the shape of a needed machining is read by CAM so as to create a toolpath necessary to control the tool of the machining device. The toolpath produced by CAM is output in a code that is readable by the machining device (e.g., G code). By controlling the trajectory of the tool in accordance with the path, the panel is machined to produce the part member.

When designing part members of a furniture product using CAD, dimensions of the designed part member can be altered on the screen according to the customer's customization request. In that event, CAM reads the design data of the part member of the dimension altered by CAD, and produces a toolpath for manufacturing the part member having the altered dimension.

Problem to be Solved by the Invention

When using CAD/CAM, NC machine needs to control the trajectory of its tool in accordance with the toolpath produced by CAM. There are many kinds or types of NC machines, and their control systems are different from each other. And a tool of a NC machine is different from that of other NC machines. Because of this, a CAM for each NC machine is used. As a result, the system using CAD/CAM actually depends on each dedicated machining device, resulting in a closed system. FIG. 1 shows a conventional system in which furniture components are designed by CAD, toolpaths then being produced by CAM and then manufactured by using a machining device.

When the dimensions of a part member designed using CAD are altered, a toolpath is be produced to control the machining device by CAM according to the altered dimensions. It benefits from expert knowledge and skill. For such reasons, it has been extremely difficult to design and manufacture custom-made furniture by using CAD/CAM, especially for small and/or medium-sized manufacturers.

On the other hand, in the case of furniture, especially woodwork furniture such as bookshelves and cabinets, machining of a part member is performed mostly by implementing typical machining such as drilling, grooving, notching to a rectangular panel. These machining operations are basically applied to a panel by controlling a tool vertically or in parallel (XYZ axis direction) with respect to a machining table of the machining device. Therefore, settings and controlling of the machining device are relatively simple. It can be done by using any machining device with 3 or more axes. Also, in the field of woodwork furniture, there is a high demand for custom-made furniture production by small and medium-sized furniture manufacturers.

Under these circumstances, there has been a need for a new open system or method which enables designing a part member of a furniture product such that the dimensions can be altered on the computer screen and the part member of the furniture product can be manufactured by using a general-purpose NC machine.

Means to Solve the Problem

In order to solve the above-described problems, inventors of the presently disclosed techniques made an intensive study and found that they can apply a system that was once developed by the inventors, i.e. designing a part member of customizable furniture as 1) rectangular parallelepiped and 2) registering machining at a predetermined position on each of the six faces of the rectangular parallelepiped. By applying the system, the inventors reached that they can register a plurality of machinings such as holes, grooves, notches, etc. each having different shapes and dimensions in a master data stored in a memory of a machining device, and select a machining from the master data of machining and register the selected machining at a predetermined position on a face of the rectangular parallelepiped of the part member, and provide the selected machining having the registered shape and size on a face of a panel of the part member. Based on above, the inventors of the presently disclosed techniques made the following techniques.

A system for altering a dimension of a part member of a furniture product designed by using a computer and manufacturing the part member by using a machining device, comprising:

means for producing and displaying a rectangular parallelepiped part member having a predetermined initial dimension on a computer screen as a rectangular parallelepiped space, and assigning an identification number to each of the six faces of the rectangular parallelepiped space of the part member;

means for setting a local three-dimensional coordinate for the rectangular parallelepiped part member space, a corner of which is set to be origin, and setting a local two-dimensional coordinate on a rectangle face of the rectangular parallelepiped space, a corner of which is set to be origin, two sides of the rectangle that perpendicularly extend from the origin are set to be X-axis and Y-axis;

a machining master in which shapes and sizes of a plurality of kinds of machinings that can be provided to the face of the part member are registered together with a specific reference position of the machining for designating a point position of the machining;

means for calculating a position of a machining to be provided on each of the six faces of the part member in accordance with a predetermined rule based on the dimensions of the rectangular parallelepiped space, and designating the position of machining by using the local two-dimensional coordinate that is set for each of the six faces of the rectangular parallelepiped space;

means for selecting a machining from a plurality of kinds of machinings registered in the machining master, and registering the selected machining at a position on a face of the rectangular parallelepiped space, to which the identification number in the rectangular parallelepiped space is assigned, that is designated by using the local two-dimensional coordinates of the rectangle face;

means for altering the dimension of the rectangular parallelepiped space of the part member according to a request from a customer, and thereby accordingly altering a local two-dimensional coordinate position of the machining registered on a rectangle face of the rectangular parallelepiped space, to which identification number in the rectangular parallelepiped space is assigned, in accordance with the predetermined rule;

means for transmitting the selected machining registered on a face of the altered rectangular parallelepiped space to the CAM of the machining device together with the identification number of the face of the rectangular parallelepiped space, a toolpath is produced in advance by the CAM of the machining device for the machining registered in the machining master so that the machining can be provided on a face of a panel to be machined by using a tool of the machining device, the machining is provided on a face of the panel to be machined by placing the panel having the dimensions of the rectangular parallelepiped space on a machining table of the machining device such that a corner of the panel matches with the machine origin of the machining device, and converting the two dimensional position of the machining registered on a face of the rectangular parallelepiped space into a two dimensional position of a face of the panel to be machined so that the tool of the machining device can be applied to the face of the panel in accordance with the toolpath.

A method for altering a dimension of a part member of a furniture product designed by using a computer and manufacturing the part member by using a machining device, comprising:

producing and displaying a rectangular parallelepiped part member having a predetermined initial dimension on the computer screen as a rectangular parallelepiped space, and assigning an identification number to each of the six faces of rectangular parallelepiped space of the part member;

setting a local three-dimensional coordinate for the rectangular parallelepiped part member space, a corner of which is set to be origin, and setting a local two-dimensional coordinate on a rectangle face of the rectangular parallelepiped space, a corner of which is set to be origin, two sides of the rectangle that perpendicularly extend from the origin are set to be X-axis and Y-axis;

calculating a position of machining that is applied to each of the six faces of the part member in accordance with a predetermined rule based on the dimensions of the rectangular parallelepiped space, and designating the position of machining by using the local two-dimensional coordinate that is set for each of the six faces of the rectangular parallelepiped space;

selecting a machining from a plurality of kinds of machinings registered in the machining master, and registering the selected machining at a position on a face of the rectangular parallelepiped space, to which the identification number in the rectangular parallelepiped space is assigned, that is designated by using the local two-dimensional coordinates of the rectangle face, altering the dimension of the rectangular parallelepiped space of the part member upon a request from a customer, and thereby altering a local two-dimensional coordinate position of the machining registered on a rectangle face of the rectangular parallelepiped space, to which identification number in the rectangular parallelepiped space is assigned, in accordance with the predetermined rule;

transmitting the selected machining registered on a face of the altered rectangular parallelepiped space to the CAM of the machining device together with the identification number of the face of the rectangular parallelepiped space, a toolpath is produced in advance by the CAM of the machining device for the machining registered in the machining master so that the machining can be provided on a face of a panel to be machined by using the tool of the machining device, the machining is provided on a face of the panel to be machined by placing the panel having the dimensions of the rectangular parallelepiped space on a machining table of the machining device such that a corner of the panel matches with the machine origin of the machining device, and converting the two dimensional position of the machining registered on a face of the rectangular parallelepiped space into a two dimensional position of a face of the panel to be machined so that the tool of the machining device can be applied to the face of the panel in accordance with the toolpath.

Preferably, the plurality of kinds of machinings registered in the machining master include a drilling with a specific diameter, a grooving with a specific width and length, and a notching with a specific vertical and lateral length.

Preferably, two or more kinds of machinings are selected from a plurality of types of machining registered in the machining master, and each machining is entered in the position designated by the local two-dimensional coordinates of a face of the rectangular parallelepiped space.

Preferably, the plurality of kinds of machinings registered in the machining master include round hole machining, and the position for registering the round hole machining on said one face is determined by setting the center of the circle of the round hole as a specific reference position.

Preferably, the predetermined rule for determining a position of a machining to be entered on a face of the part member is set as a function of the lengths of two sides of the rectangle of the face. When the dimension of the rectangular parallelepiped space of the part member is altered according to the customer's request, the length of the vertical and lateral sides of the rectangular face of the rectangular parallelepiped space is altered accordingly, and then based on the length of the two sides of the rectangle of the altered face, the local two-dimensional coordinate position of the machining after the dimension alternation is determined.

In the system/method of the presently disclosed techniques, information necessary to specify the shape and dimension of machining such as holes, grooves, and notches is registered in the machining master. Information about a tool that is used for machining and methods for machining is not included in the registered information of the machining master. Therefore, these can be freely determined by the machining device side. However, use of a specific tool of a specific machining device can be agreed between the system of the presently disclosed techniques and a manufacturer. In that case, the designation of the tool used for such specific machining can be registered as an agreement with a specific furniture manufacturer, in which the agreement is linked to the machining registered in the machining master, separately from the machining master.

In the system/method of the presently disclosed techniques, a toolpath for providing a machining registered in the machining master (identified by the shape and dimension of holes, grooves, notches, etc.) can be produced in advance by using the CAM on the machining device side. Therefore, it is not necessary for the machining device to create a new tool path scratch using the CAM, upon receiving the part member design information. As a result, the part member can be manufactured within a short delivery time.

In the presently disclosed techniques, when the dimension of the part member is altered, the XY coordinate position of a machining registered on the face of the rectangular parallelepiped of the part member is altered accordingly in accordance with a predetermined rule. When a panel having a same dimensions as that of the rectangular parallelepiped after the alternation is placed on the machining table of the machining device such that a local two-dimensional coordinate position of the corner of rectangular parallelepiped of the part member matches with the machine origin of the machining device (=corner of the panel), it becomes possible to convert the two dimensional position of the machining on a face of the rectangular parallelepiped into a two dimensional position on the panel. As a result, even if the dimension of the furniture part is altered according to the customer's request, it is possible to manufacture the part member whose dimension has been altered by using a toolpath which is already created.

According to the method/system of the presently disclosed techniques, the machining registered in the machining master is not limited to typical machining shapes and dimensions such as drilling, grooving and notching but can include machining shapes and dimensions of non-typical such as ellipse, curve, wave line, etc. In that case, the machining device produces a toolpath for machining of such non-typical or complex shape by using CAM programming and apply the toolpath when such machining is selected.

The machining device that can be used in the method/system of the presently disclosed techniques is not limited to any particular kinds or types as long as it is possible to implement machining to the panel by controlling its tool based on the data of the rectangular parallelepiped, XY coordinate position on the face of the rectangular parallelepiped and the machining registered in the machining master to be applied to the position. As far as the ability of creating a toolpath to control a tool based on the data received from the system/method of the presently disclosed techniques is confirmed, any kinds or types of machining device, regardless of whether it is a general-purpose machine or dedicated machine, can be used.

According to the method/system of the presently disclosed techniques, machinings that can be provided by a plurality of machining device having different processing capabilities can be registered in the machining master. The system can assign its manufacturing order to a manufacturer/machining device among the plurality of machining devices according to the processing capability of the machining device of the furniture manufacturer.

BRIEF EXPLANATION OF DRAWINGS

FIG. 6 shows a bookshelf designed by using the system of the presently disclosed techniques.

FIG. 8 shows an example of part member face correlation given between part members of the cabinet of FIG. 7(A).

FIG. 9 shows the unit space/part member face correlation between the six faces of the unit space of the cabinet 100 of FIG. 7(A) and the face of the part member.

FIG. 14 shows an example of bill of materials (BOM) data of the bookshelf of FIG. 6 designed using the system of one embodiment of the presently disclosed techniques after lowering the height of the bookshelf by 10 mm.

FIG. 15(A) shows an example of a specification of machining applied to the face of a part member of the cabinet of the bookshelf of FIG. 6 that is designed by using the system of an embodiment of the presently disclosed techniques. FIG. 15(B) shows a specification of machining of the bookshelf of FIG. 6 that is designed by using the system of an embodiment of the presently disclosed techniques after lowering the height of the bookshelf by 10 mm. FIG. 15(C) shows a specification of machining of the bookshelf of FIG. 6 that is designed by using the system of an embodiment of the presently disclosed techniques after lowering the height of the movable shelf panel by 10 mm.

DESCRIPTION OF EMBODIMENTS OF INVENTION

Figure 1:
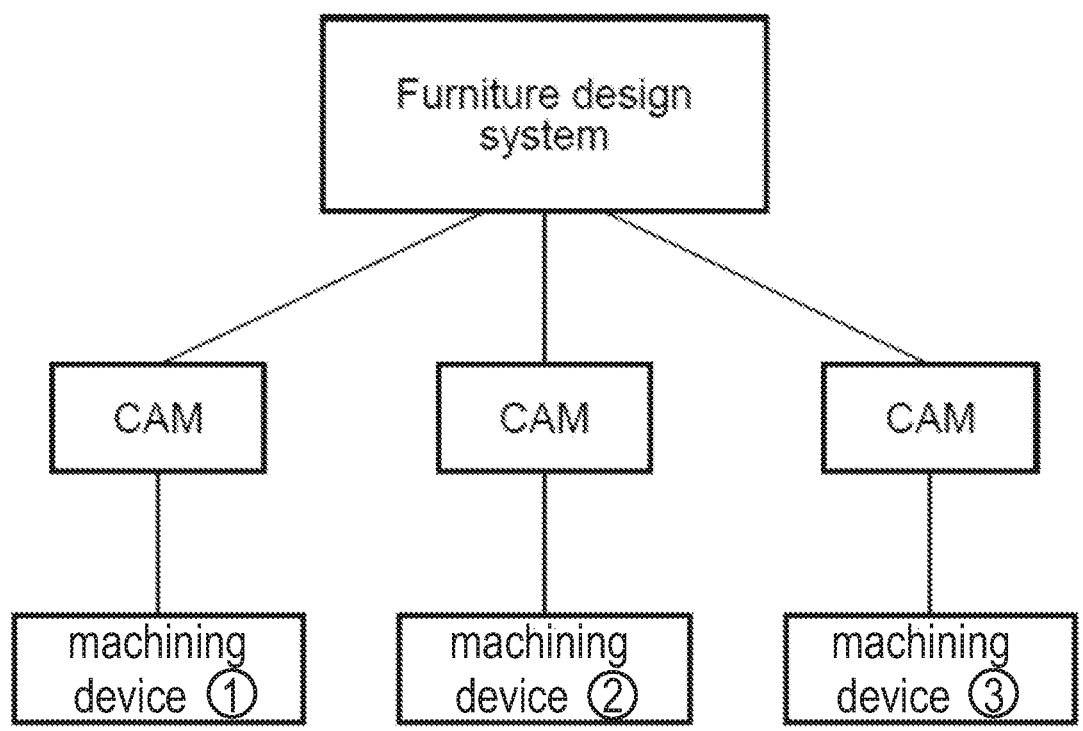
FIG. 1 shows a system in which furniture components are designed and manufactured by a machining device using prior art.

Embodiments of the presently disclosed techniques will be described in detail with reference to the drawings as follows. The meaning of each term used to describe the embodiments of the presently disclosed techniques will be described in detail as well.

In the present application, "CAD" is an abbreviation of Computer aided design, broadly encompasses design aid tool using a computer.

In the present application, "CAM" refers to an abbreviation of Computer aided manufacturing, which broadly encompasses a system for implementing general production preparation on a computer, such as producing NC programs for machining, using CAD-created shape data as input data.

In the present application, "CAD/CAM" refers to a system that performs the functions of both CAD and CAM, which performs all processes from designing to NC programming in one system.

In the present application, "toolpath" refers to a trajectory or path of a tool that is created to control a tool of a machining device to implement or provide machining such as cutting to an object of machining.

In an embodiment of the presently disclosed techniques, "machine origin" refers to XYZ coordinate origin that is used as a reference when the machining device controls its tool in accordance with the toolpath. A machining device can set the device origin at a fixed position, or the machining device can set the machining origin to be a different position which can be determined with respect to an object to be machined.

In an embodiment of the presently disclosed techniques, "furniture product" includes a wide range of housing equipment such as storage shelves, kitchen shelves, unit buses, etc. Usually, material of part members of furniture product is wood. However, it is not limited to any specific materials. It may be made of metal, stone, marble, or glass.

In an embodiment of the presently disclosed techniques, "unit design system" refers to a tool that forms a part of the system of the presently disclosed techniques. The unit design system produces data of part members of furniture product, selects a machining from the machining registered in the machining master and register it at the position designated by XY coordinate of the rectangle of each of the six faces of the part members, and produces a unit that is formed of a part member or a plurality of part members having machining registered thereon.

In an embodiment of the presently disclosed techniques, "unit assembly system" refers to a tool for producing a furniture product by combining units produced by the unit designing system. The unit assembly system moves positions of unit spaces on a screen, combines the units, and alters dimensions so as to design a furniture product having dimensions and a shape that are desired by a customer, and assigns a product number to the furniture product, and outputs BOM data and specification of machining data of part members of the furniture product.

In an embodiment of the presently disclosed techniques, "part member" refers to a basic component such as a panel, that constitutes a furniture product. In an embodiment of the presently disclosed techniques, contour of part members are all rectangular parallelepiped, and machining such as holes, grooving, and/or notching are provided on the rectangular parallelepiped contour to form the actual shape of the part member. In an embodiment of the presently disclosed techniques, a part member is produced as a rectangular parallelepiped space on a PC screen. Length, width and thickness of the rectangular parallelepiped of a part member are set by the distances in X, Y, and Z directions from the origin of XYZ coordinate (local coordinate) set on a PC screen, which is a corner of the rectangular parallelepiped space. Each dimension of a part member is set as an alterable or fixed value. Since the thickness of a panel is usually constant, the values in the lengthwise and widthwise direction are set as alterable values, and the value in the thickness direction is set as a fixed value. A machining selected from machining master (later described) is registered on a position designated by XY coordinate set on each of the six faces of the rectangular parallelepiped.

In an embodiment of the presently disclosed techniques, the "identification number" refers to a number or identifier for identifying each face, which is given to each six faces of the part member.

In an embodiment of the presently disclosed techniques, "attachment" refers to a component such as a dowel and/or a screw, which is used as an attachment of a part member of a furniture product. The dimension of an attachment such as a dowel or a screw is defined by industry standard, and therefore there is no need to be selected or changed in accordance with the dimension of a part member. Hence, there is usually no setting of a parallelepiped space for the attachment, and a dowel or screw of a certain standard is registered in master data of a memory to be registered on a designated position on a face of a part member. The attachment registered on a face of a part member is output on the bill of materials (BOM) together with the data of the part member.

In an embodiment of the presently disclosed techniques, components such as a hinge fitting, a handle of a door, and rails of a drawer are fittings of a part member that are attached on a part member of a furniture product. These fittings of a part member are designed in the same manner as a part member, and their smallest three-dimensional circumscribing parallelepiped space is set as a contour of the fitting of the part member. Although shapes of the fitting such as a hinge, a handle of a door, and rail of a drawer are not rectangular parallelepiped, their contours are set as rectangular parallelepiped, and the actual shape is formed by providing machining such as cutting, notching, and holes to the six faces of the rectangular parallelepiped.

The number and dimension of hinge fitting(s), handle(s) of a drawer, and rail(s) of a drawer need to be selected and/or altered in accordance with the dimension of a part member. Therefore, a circumscribing parallelepiped space is set for each of the components such as a hinge fitting, a handle of a drawer, and rails of a drawer, so that the length, width and thickness of the rectangular parallelepiped can be altered by altering dimensions in X, Y, and Z directions on a PC screen.

Figures 19A, 19B, 19C:
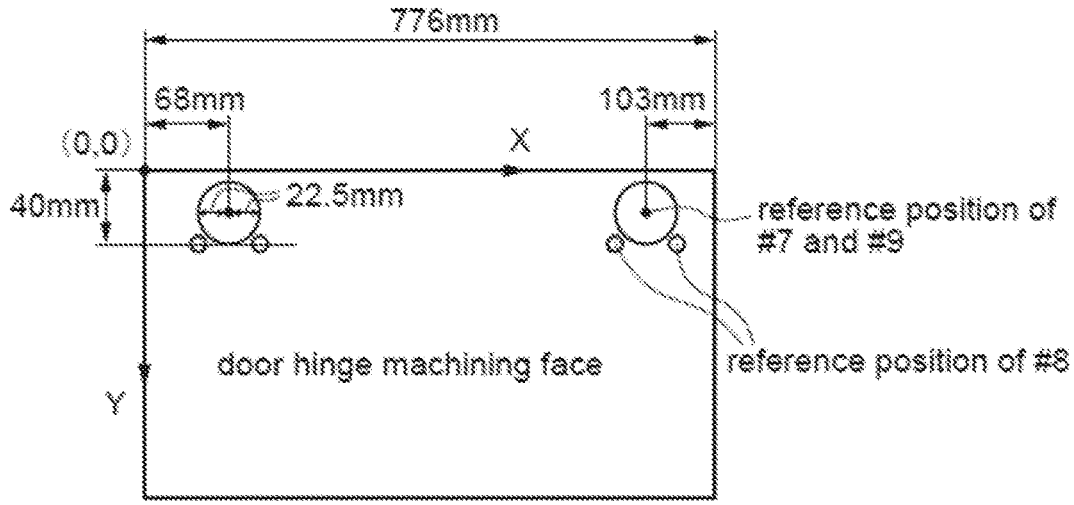
FIG. 19 shows an example of a machining master of machining according to an embodiment of the presently disclosed techniques.

Referring to FIG. 19(A), a plurality of holes having different diameters are registered on a face of the rectangular parallelepiped space of the fitting parts, and the plurality of holes are transferred to a side of the door. As a result, the plurality of holes with different diameters registered on a face of the rectangular parallelepiped space of the hinge fitting are registered on a side of the door as one set. The machining master may register a plurality of holes with different diameters as one set. Or it may register each of the plurality of holes individually. When the machining device is equipped with a tool that can drill a plurality of holes with different diameters at one time, registering a plurality holes with different diameters as one set in the machining master is convenient. When the machining device is not equipped with such tool, each hole with a different diameter can be registered in the machining master so that each of the plurality of holes with different diameters can be registered at respective positions on the rectangular parallelepiped face of the part member. For other machining such as grooving and notching, it is also possible to register a plurality of machinings with different sizes in the machining master as one set.

In an embodiment of the presently disclosed techniques, a part member may be a solid panel made of a single wood, or may be a composite panel formed of a core component, a surface sheet affixed to the core component and a butt end sheet. When the part member is a composite panel, its core component, surface sheet and butt end sheet that forms the part member are collectively referred to as "element material." "element material space" refers to a circumscribed rectangular parallelepiped space of an element material. "Surface sheet space" refers to a circumscribing rectangular parallelepiped space of a surface sheet. "Butt end sheet space" refers to a circumscribing rectangular parallelepiped space of a butt end sheet. "Core component space" refers to circumscribing rectangular parallelepiped space of a core component. The system/method for designing a part member of furniture product of the presently disclosed techniques can be applied to element material and element material space as well.

In an embodiment of the presently disclosed techniques, "unit" refers to a three-dimensional structure that forms a constituent unit of a product. A plurality of part members may be combined to form a unit. Or a single part member may be set as a single unit. In the embodiment of the presently disclosed techniques, in a product formed of a plurality of part members, what to set as a part member, unit, or a combination of units, whether to set as a part of another structure or a single member which can be independently located is a design matter left to the designer.

In the example of the bookshelf shown in FIG. 6, the cabinet 100 is a unit of a box formed of part members of five panels including left/right side panels, bottom panel, top panel. The part member of shelf panel 106 is set as a separate unit formed of a single part member. It is also possible to set the shelf panel 106 as one of the part members that constitute the cabinet 100, like side panels, top panel, bottom panels, and back panel. When the shelf panel 106 is accommodated in the cabinet 100 so that it can be inserted and pulled out using a dowel, it is advantageous and desirable to set the shelf panel 106 as a single unit of a part member.

In an embodiment of the presently disclosed techniques "unit space" refers to a virtual three-dimensional rectangular parallelepiped space that circumscribes a unit. When a plurality of part members is combined to form a unit on a display screen of the system of the presently disclosed techniques, a space that circumscribes and accommodates the unit is set as a "unit space" of the unit. By setting the virtual three-dimensional rectangular parallelepiped space circumscribing the unit as a unit space, a position of a part member that belongs to the unit can be easily calculated and/or set in the positional relationship relative to the unit space. Usually, a three-dimensional rectangular parallelepiped space that circumscribes a unit is set as a unit space. However, if necessary, it is possible to set a unit space by reducing or enlarging the three-dimensional rectangular parallelepiped space that circumscribes the unit.

In one embodiment of the presently disclosed techniques, the dimension of the part member is altered by altering the dimension of the unit space of the unit that is constituted by the part member(s). When a dimension of a unit space is altered, the dimension of one or more part member(s) that is or are correlated to six faces of the unit space by providing unit space/part member face-correlation therebetween is altered. Further, when six faces of a unit space are correlated to six faces of another unit space by providing unit space face-correlation therebetween, dimension of a unit space can be altered by altering the dimension of another unit space. By these, dimensions of a unit constituting respective unit spaces and dimension of part members constituting the unit can be altered altogether accordingly.

When the unit is formed of a plurality of part members, position of each part member constituting the unit can be determined based on the unit space by setting distance between each of the six faces of the unit space and corresponding each face of part members that are in parallel to the corresponding face of the unit space. Once the position of the part member is determined with respect to the unit space, the dimension and position of the part member can be altered accordingly by altering the dimension and position of the unit space.

In an embodiment of the presently disclosed techniques, "skeleton unit" refers to a unit that has a space capable of entirely or partially accommodate another unit (infill unit). In an embodiment of the presently disclosed techniques, "Infill unit" refers to a unit that is entirely or partially accommodated in an internal space (cell space) of another unit (skeleton unit). In the bookshelf shown in FIG. 5, the cabinet formed of a combination of a top panel, side panels, a bottom panel, and a back panel is a skeleton-unit. The shelf panel housed inside the cabinet is an infill-unit. Since the skeleton-unit and infill-unit are separate units to each other, dimension of one unit will not be altered in conjunction with the alteration of dimension of the other. However, by providing a face correlation between the units via cell space (described later), it becomes possible to alter the dimension of one unit in accordance with the alteration of the dimension of another unit.

In an embodiment of the presently disclosed techniques, "cell space" refers to a space that can inscribe and accommodate all or a part of an infill unit inside a skeleton unit. By setting a "cell space" in an internal space surrounded by part members of the skeleton unit, a unit space of the infill unit can be inscribed and accommodated in the cell space. A position of the infill unit inscribed and accommodated in the cell space can be set based on the cell space by setting a distance between each of six faces of the cell space and each of six faces of the unit space of the infill unit that is in parallel with corresponding six faces of the cell space.

In an embodiment of the presently disclosed techniques, "Part member face-correlation" refers to correlating a face of a part members face with a face of another part members pace by fixing a distance therebetween. If the distance is zero, both faces are on a same plane. In the event that a unit is formed of a plurality of part members by providing part member face correlation between parallel two faces of the part members, it becomes possible to alter the dimensions of another part member in accordance with the alternation of a dimension of a part member. FIG. 8 shows the part member face-correlation between the left and right side panels, top panel, bottom panel, and back panel that constitute the cabinet of FIG. 7(A).

In an embodiment of the presently disclosed techniques, "unit space/part member face-correlation" refers to correlating a face of a part member constituting a unit with a parallel and corresponding face of a unit space of the unit by fixing a distance therebetween. The unit space/part member face-correlation between the face of the unit space and the face of the part member constituting the unit allows the dimension of the part member to be altered following an input of an alteration of a dimension of the unit space, based on the settings of the unit space/part member face-correlation. FIG. 9 shows the unit space/part member face-correlation given between the six faces of the cabinet unit space in FIG. 7(A) and the part member face of the cabinet.

In an embodiment of the presently disclosed techniques, "machining" refers to a machining such as hole, cutting, or groove that is provided to a panel to be machined. In an embodiment of the presently disclosed techniques, contour of all part members are rectangular parallelepiped, and machining such as hole, grooving, and/or notching are provided on the rectangular parallelepiped contour to form the actual shape of the component. In the design system of an embodiment of the presently disclosed techniques, a specific machining is selected from machining master data registered in a memory, and the selected machining is registered on a position designated by XY coordinate on a face of a part member.

In the system/method of the presently disclosed techniques, machining is registered on the face of the rectangular parallelepiped space as drilling, grooving, notching, etc. of a specific shape/dimension that is to be provided to a face of the panel. The actual processing of the registered machining on the panel is left to the machining device side depending on the type etc. of the tool equipped in the machining device. In the example shown in FIG. 17, Both A factory and B factory can implement machinings of forming hole A and F and notch D on the panel by using the same machining device (NC machine drill, corner cutter). For providing groove machining E, A factory who is equipped with a tenoner can create a groove by using the tenoner. However, B factory who is not equipped with a tenoner uses NC drilling tool to create the groove.

In an embodiment of the presently disclosed techniques, "machining master" refers to master data in which a plurality of types of machining to be provided to a panel, such as drilling, grooving and notching, are registered. The machining master is stored in a memory of the computer of the design system of the presently disclosed techniques. The information which is necessary to specify the shape and dimension of the machining to be provided to the panel is registered in the machining master. The registered information further includes the specific reference position of the machining that is used as a reference for designating the point position of the machining in relation to the two-dimensional coordinate position on a face of a part member.

What method should be used to provide a machining having a specific shape and size is left to a decision of machining device side. Therefore, it is not included in the information registered in the machining master. However, it is possible to include the information of tools and/or other methods used to provide a specific machining in the machining master by prior agreement with a specific furniture manufacturer/machining device. In that case, the tool or other method may be used included in the design data in connection with to a particular furniture manufacturer/machining device.

FIG. 19 shows an embodiment of drilling holes. Refer to FIG. 19(A), in order to attach a hinge fitting for connecting a door of a cabinet with a side panel, #7: a cup hole having 35 mm diameter and #8: two hinge driving holes having 2.5 mm diameter at both sides of the cup hole are provided. If the machining device has a tool that can create both #7: a cup hole having 35 mm diameter and #8: two hinge holes having 2.5 mm diameter at both sides of the cup hole, #9: hinge machining hole (combination of a cup hole and two hinged holes) will be provided at both ends of the door.

Figures 20A, 20B, 20C:
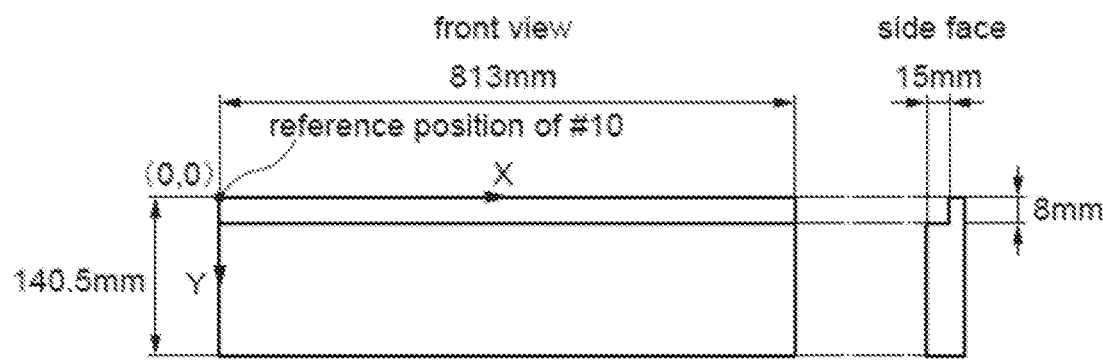
FIG. 20 shows an example of a machining master of machining according to an embodiment of the presently disclosed techniques.

FIG. 19(B) machining master of drilling holes #7, #8 and #9 of FIG. 19(A). FIG. 20(C) shows XY coordinate positions of drilling holes #7, #8 and #9 that are provided on the door. In the machining master of FIG. 19(B), it is assumed that the machining device is equipped with a tool that can perform drilling the holes of #7, #8 and #9. However, if the machining device used by the system of the presently disclosed techniques does not have a tool that can provide both a cup hole of 35 mm diameter and two #8 hinge driving holes of 2.5 mm diameter at both sides of the cup hole, #9 will not be registered in the machining master.

Figures 21A, 21B, 21C:
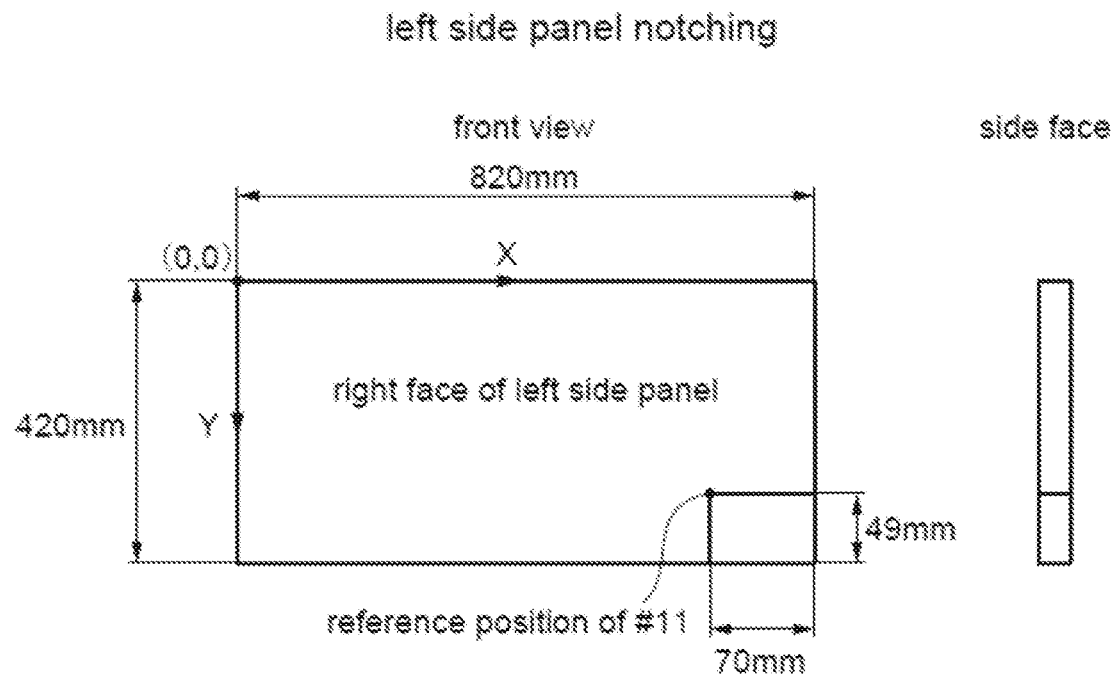
FIG. 21 shows an example of a machining master of machining according to an embodiment of the presently disclosed techniques.

FIG. 20 shows an embodiment of grooving machining. Referring to FIG. 20(A), #10: a line handle groove having width 813 mm, depth 15 mm and height 15 mm is provided at a corner of a drawer front panel. FIG. 20(B) shows the machining master of the line handle groove of FIG. 20(A). FIG. 21(C) shows XY coordinate position of #10: groove for line handle. In the machining master of FIG. 20(B), it is assumed that the machining device is equipped with a tool that can perform the grooving machining to create the #10 line handle. As in the case of drilling holes, if the machining device is equipped with a tool that can create a plurality of grooves, a combination of grooves and holes, or a combination of grooves and notches, the plurality of machinings can be registered in the machining master as a single machining.

FIG. 21 shows an embodiment of notch machining. Referring to FIG. 21(A), a through hole of #11: notch width 70 mm and depth 49 mm is provided at a corner of a side panel. FIG. 21(B) shows machining master of #11: notch machining of FIG. 21(A). FIG. 21(C) shows XY coordinate position of the notch of #11: In the machining master of FIG. 21(B), it is assumed that the device has a tool that can provide the notch of #11. As is in the case of drilling a hole, when the machining device is equipped with a tool that can provide a plurality of notches, or a combination of notch and hole, or a combination of notch and groove, the machining master can register the plurality of machinings as a set of machinings.

A method of preparing the machining master of the presently disclosed techniques is to register all of the machinings that can be provided by using the machining device of a furniture manufacturing factory that works with the furniture designing and manufacturing system of the presently disclosed techniques. Another method of preparing the machining master of the presently disclosed techniques is to register all of the machinings that can be provided by using machining devices of a plurality of furniture manufacturing factories that work with the furniture design manufacturing system of the presently disclosed techniques. In this case, the machinings registered in the machining master are linked to the furniture manufacturing factory/machining device that can implement the machining so that manufacturing orders can be sent or assigned to furniture manufacturing factories depending on their capability of machining.

In an embodiment of the presently disclosed techniques, "machining position" refers to a position on a rectangular parallelepiped face of a part member to which a machining selected by using the system of the presently disclosed techniques is input. The machining position is designated by using the XY coordinates of the rectangular face to which a machining is provided.

Figure 17:
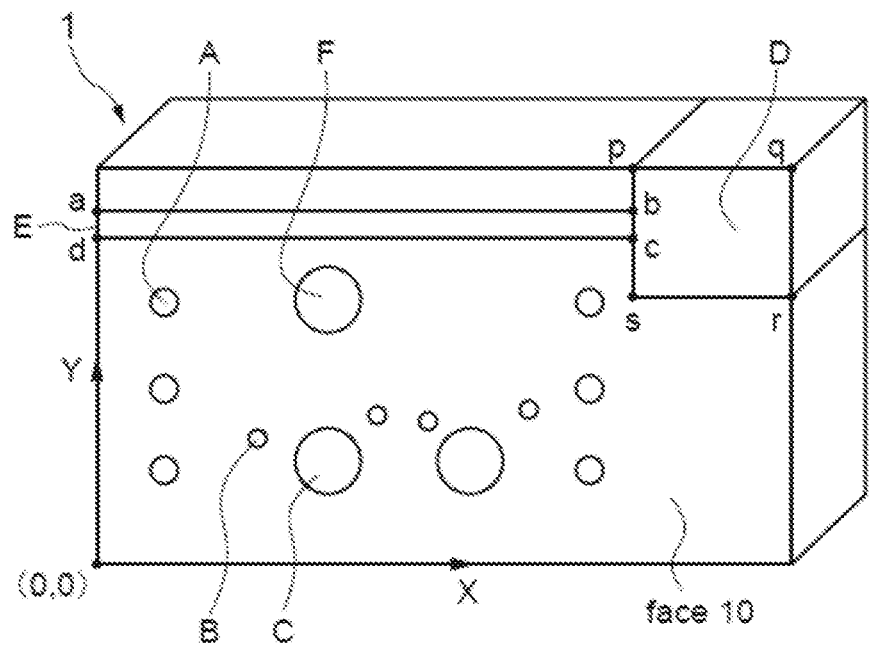
FIG. 17 shows an example of machining that can be applied to a furniture component designed in the system of one embodiment of the presently disclosed techniques.

Referring to FIG. 17, the center position of each hole of A, B, C and F is set to be the machining position under the XY coordinate in which the lower left corner of the rectangle of face 10 of panel 1 is the origin. The machining position of groove E is designated by the four points: a, b, c and d that are surrounding the laterally long rectangle on the face 10. The machining position of notch D is designated by the four points p, q, r and s that are surrounding the rectangle on front face of the notched corner of the panel to be machined in the same manner on the face 10. Information of these machining positions are used in determining the position where the machining device performs machining such as holes, grooves, and notches on the machining object, along with the specific reference position of machining which will be described later.

When registering a machining at a predetermined position on the rectangular parallelepiped face of a part member by using unit designing system, a specific machining is firstly selected from the machining master, and then the selected machining is registered at a designated position. Alternatively, it is possible to designate a predetermined position on the face and then register the machining selected from the machining master at the designated position.

In an embodiment of the presently disclosed techniques, the "specific reference position" or "reference position" refers to a position of a machining to designate a point position of machining having a shape and size under two-dimensional coordinate system set on a face that is used to register a machining on a face of a part member.

While the machining position is designate to be the XY two-dimensional coordinate position on the face where machining is registered, the specific reference position is used to designate a point position of the machining itself having a certain shape and dimension, without regard to the face of the part member to be registered thereon.

For example, in the case of circle hole machining having a certain diameter, the center of the circle hole is set as the specific reference position of the circle hole machining. In machining of a more complex shape than a circle hole, the position considered as the center of the machining shape can be set as the specific reference position.

The center of the shape of a machining can be determined at the time of registering a machining in the machining master. For example, in the case of #9 hinge hole in FIG. 19(A), the center of #7 cup hole can be set as the specific reference position of the #9 hinge hole. By defining the position of machining having a certain shape and dimension as the specific reference position of the machining, it becomes possible to register a machining in the XY coordinate position that is designated on the face of the part member.

Figure 18:
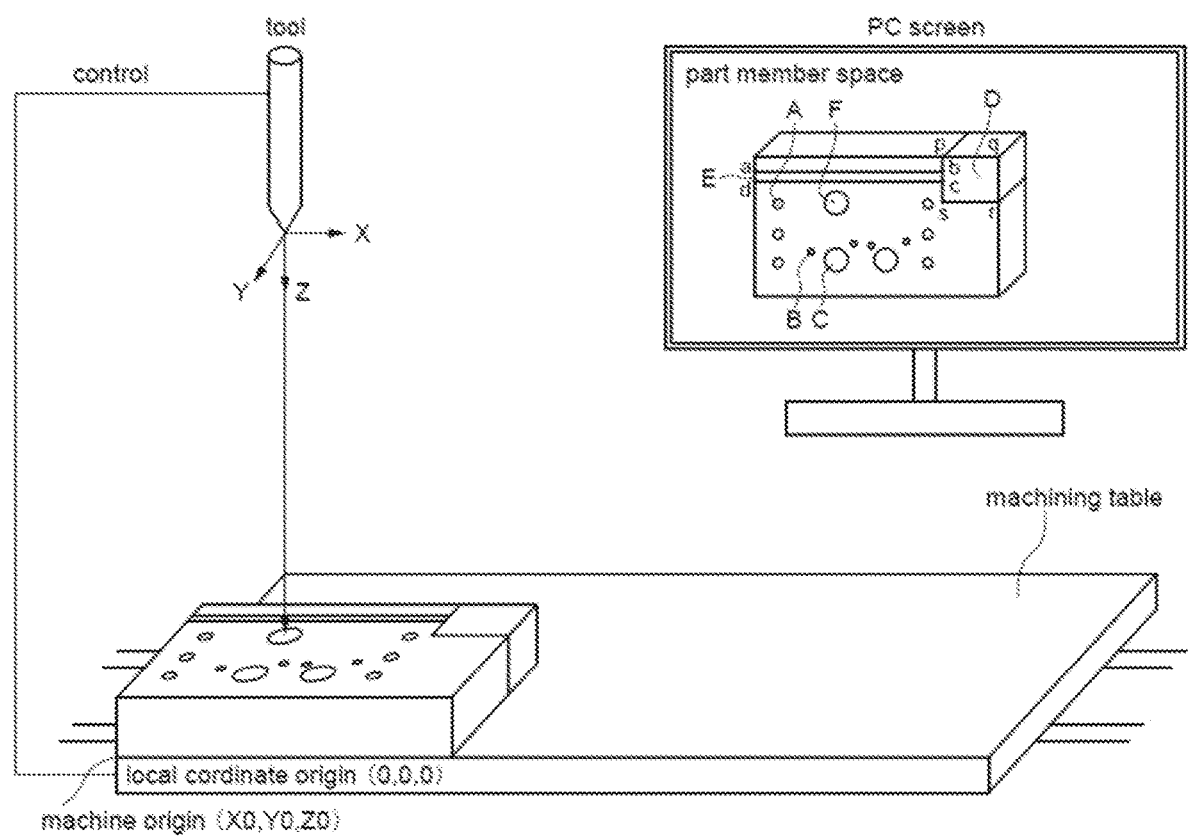
FIG. 18 shows an example of a machining device of an embodiment of the presently disclosed techniques.

In an embodiment of the presently disclosed techniques, "machining device" refers to an apparatus used by a furniture manufacturer to machine a component of a furniture product, such as NC machine, doweling machine, tenoner, cutting saw, or the like. FIG. 18 shows the setting of a tool for machining the panel shown in FIG. 17 by using the machining device used in the embodiment of the presently disclosed techniques.

In an embodiment of the presently disclosed techniques, bill of materials (BOM) includes dimension data of a part member designed by using the system of the presently disclosed techniques.

In an embodiment of the presently disclosed techniques, "machining specification (NC)" includes data of machining that is registered in the XY coordinate position of the face to which identification number of the face of part member designed by using the system of the presently disclosed techniques is assigned.

The machining specification includes the information about the object to be machined (panel, etc.), information about the machining to be provided to the object to be machined, and information about the position of providing the machining. Upon receiving the data output from the system of the presently disclosed techniques, the manufacturing plant can select a type, tool, and machining method of the machining device to be used for machining, depending on the capability of the machining device of the manufacturing plant based on the data of bill of materials and machining specification.

Embodiments of the presently disclosed techniques will be described in detail with reference to the drawings as follows. The system according to the embodiment of the presently disclosed techniques can be operated as application software running on an OS such as Windows (registered trademark). Preferably an application programming interface such as OpenGL (registered trademark) is installed as a 3D computer graphics interface between the OS and the application software of the present system.

Figure 2A:
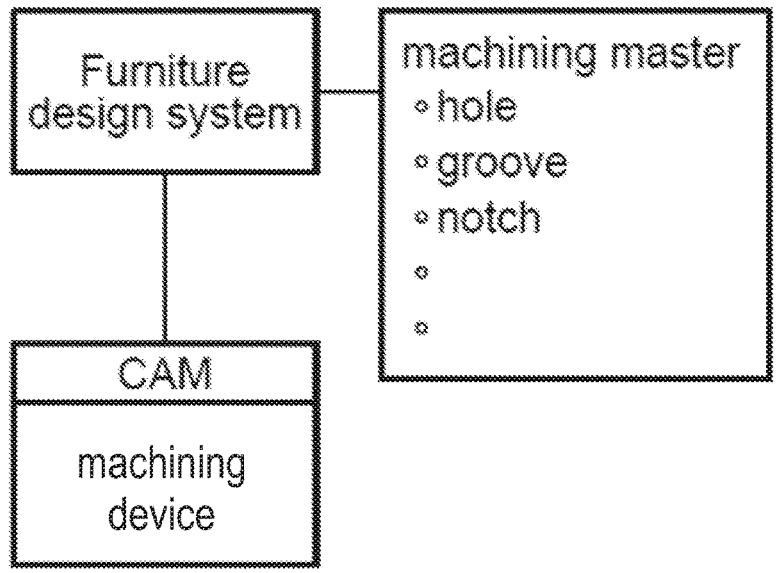
FIG. 2(A) shows a conceptual diagram showing furniture part members are designed and manufactured by a machining device using the system of the presently disclosed techniques.

FIG. 2(A) shows the entire configuration of the furniture design/manufacturing system according to an embodiment of the presently disclosed techniques. In FIG. 2(A), when designing a part member of a furniture product using the furniture design/manufacturing system of the presently disclosed techniques, a machining is selected from the machinings registered in the machining master (such as holes, grooves and notches) and the selected machining is registered at a predetermined position on a face of a part member to which identification number is assigned. Upon receiving design data of the part member, the machining device performs the necessary settings such as the machining order, etc., and then controls its tool according to the toolpath produced in advance by the CAM for machining.

Figure 2B:
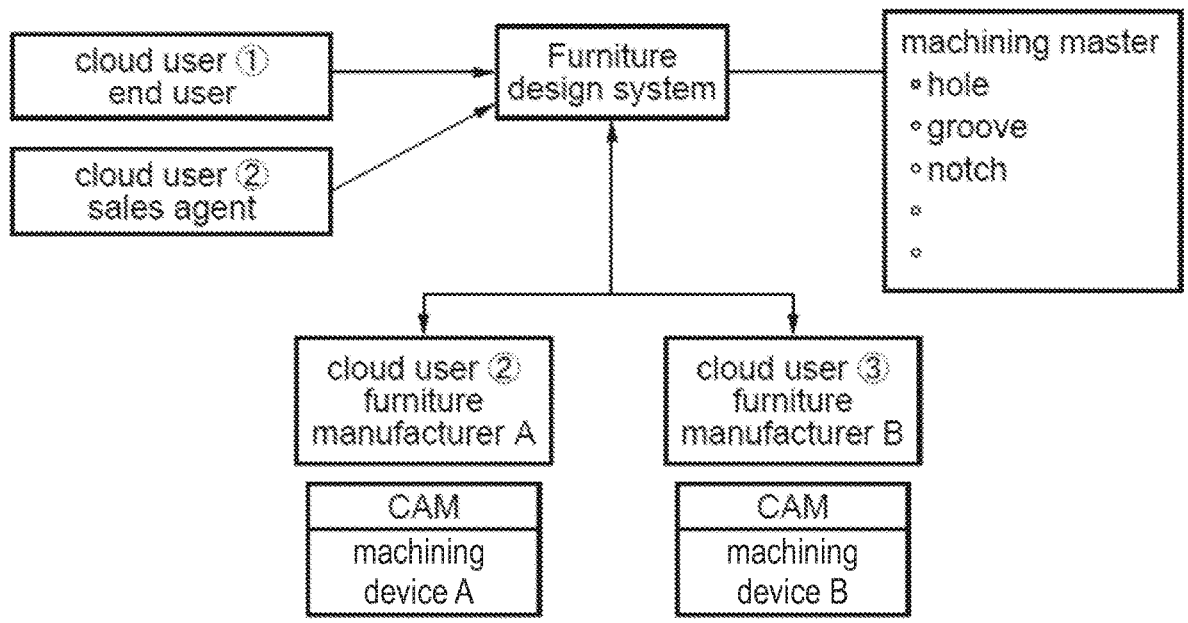
FIG. 2(B) shows a conceptual diagram of the system of the presently disclosed techniques when used on a cloud system.

FIG. 2(B) shows the entire configuration diagram of the furniture design and manufacturing system according to an embodiment of the presently disclosed techniques that is operated by uploading on a cloud server. In FIG. 2(B), the furniture design system of the presently disclosed techniques is licensed to a plurality of users via cloud system. A furniture distributor, who is a cloud user, can assign an order of manufacturing a furniture product that was designed by using the system of the presently disclosed techniques to a furniture manufacturing plant, who is also a cloud user. A furniture manufacturer, who is a cloud user, can receive an order to manufacture a furniture product that was designed by using the system of the presently disclosed techniques from a furniture sales agent who is also a cloud user.

Figure 3:
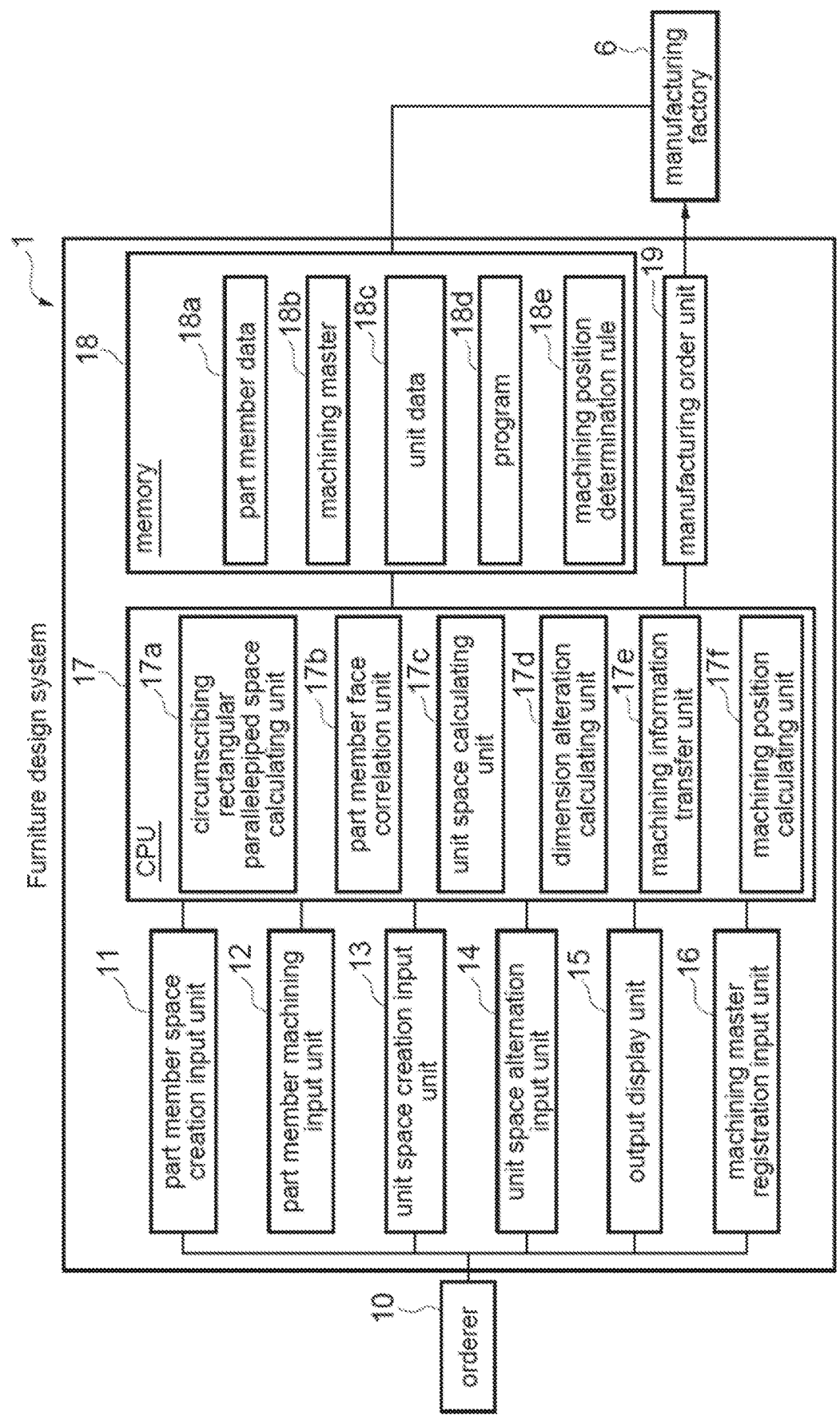
FIG. 3 shows an internal configuration of a furniture design system according to an embodiment of the presently disclosed techniques.
Figure 4:
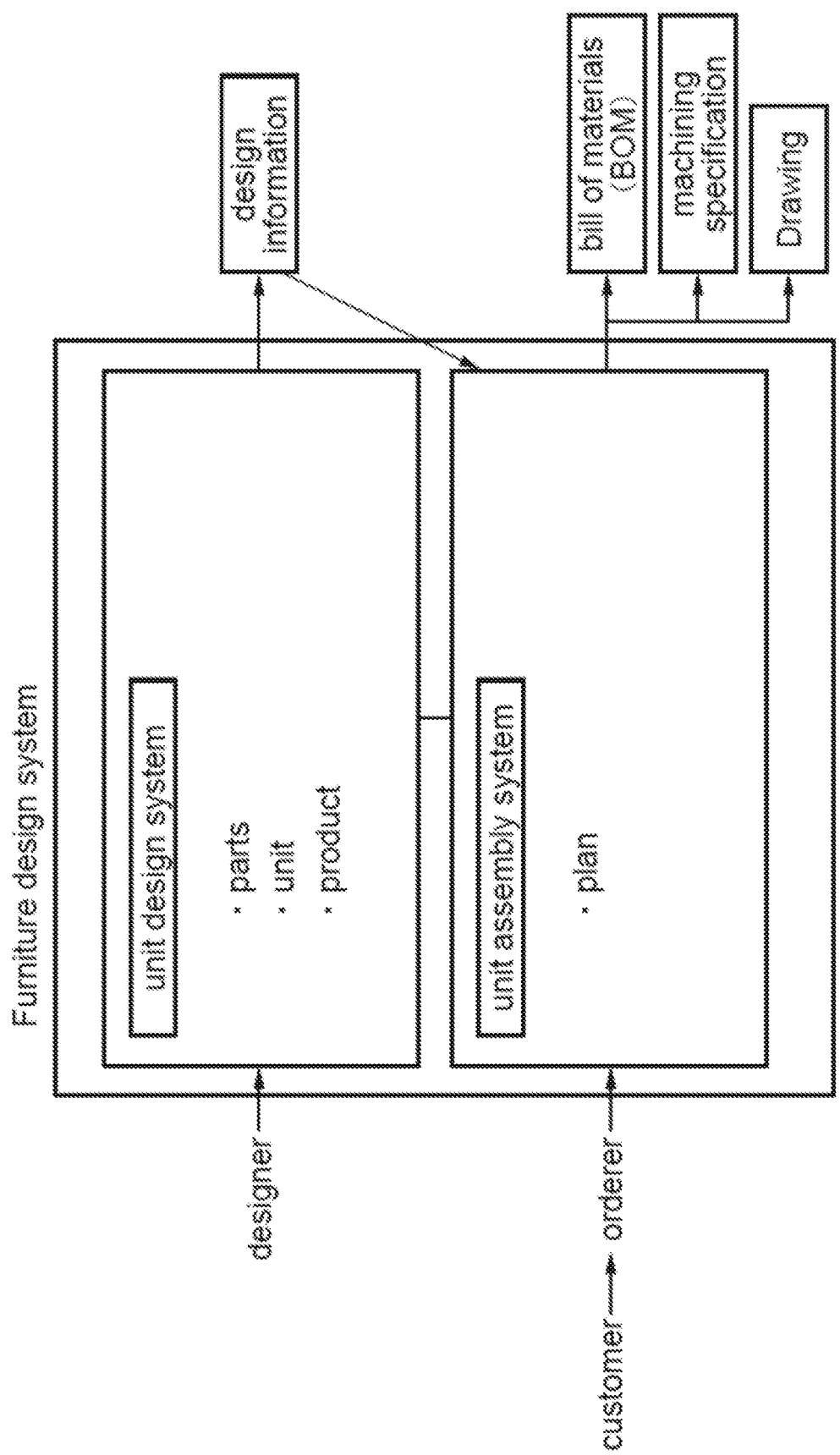
FIG. 4 shows an internal configuration of a furniture design system according to an embodiment of the presently disclosed techniques.

FIGS. 3 and 4 show the internal structure of the furniture design system according to an embodiment of the presently disclosed techniques. Referring to FIG. 3, present system 1 includes a part member space creation input unit 11, a part member machining input unit 12, a unit space creation input unit 13, a unit space alteration input unit 14, an output display unit 15, and a machining master registration input unit 16, a central processing unit (CPU) 17, a memory 18, and a manufacturing ordering unit 19.

The present system 1 can be operated from a PC that is connected to a server. The orderer 10 reads the data stored in the memory 18 and inputs the requested specification of a product using the part member input unit 11. The requested specification of the product is processed by CPU 11 and altered design of the product is displayed on the output display unit 15. The altered product is output and displayed as a three-dimensional image on the PC screen by the output display unit 15 so that the orderer 10 can confirm the specifications of the displayed product and finalize the order.

The CPU 17 includes a circumscribing rectangular parallelepiped space calculating unit 17a, a part member face correlation unit 17b, a unit space calculating unit 17c, a dimension alteration calculating unit 17d, a machining information processing unit 17e, and a machining position calculating unit 17f. The circumscribing rectangular parallelepiped space calculation unit calculates a virtual three-dimensional circumscribing rectangular parallelepiped space of each part member to produce the rectangular parallelepiped of the part member. Identification numbers are assigned to the six faces of the calculated rectangular parallelepiped. Based on the identification numbers assigned to the six faces, a face of a part member is correlated to a face of another part member. Further, in the six faces of the calculated rectangular parallelepiped, CPU 17 sets XY coordinate system on a rectangle face of a part member, in which a corner of each of the rectangles that constitute the six faces of the calculated rectangular parallelepiped is used as an origin and then XY coordinates system is set in which two sides of the rectangle extend from the corner as X-axis and Y-axis, by which a position of each face can be designated by using the XY coordinate.

The dimension alteration calculation unit 17d receives data of alteration of the part member dimensions that was input by the unit space alteration input unit 14. Then, the dimension alteration calculation unit 17d alters the dimensions of the part member space that is face-correlated (Unit space/part member face-correlation) with the unit space in accordance with the alteration input based on face-correlation between the face of the part member calculated by the circumscribed rectangular parallelepiped space calculation unit to which identification number is assigned and the face of a part member that constitutes the same unit.

When data of a machining to be provided to a face of the part member by the part is input by the member machining data input means, the machining information transfer unit transfers the machining data. Data of a product designed by the calculation is provided with a product number and sent to memory 16 to be stored therein from CPU 10.

Memory 18 is composed of, for example, a hard disk storage medium, RAM, or ROM, and stores the machining master, part member data, machining position determination rule 18e, and the products designed by the input means and identified by the product numbers. The memory 19 further stores programs necessary for execution and output of the operations of the presently disclosed techniques.

The machining master 18b stored in the memory 18 registers the shape and dimensions of machining that can be performed by the machining device of a furniture manufacturer to whom orders to manufacture the furniture product is sent from the system of the presently disclosed techniques.

Referring to FIG. 4, an embodiment of the presently disclosed techniques includes a unit design system for designing a unit of a furniture product and a unit assembly system for designing a furniture product by assembling the units designed by the unit design system and for outputting bill of materials (BOM) of each part member and the machining specification (NC) of each part member based on the data of the part member having the same product part number.

Figure 5A:
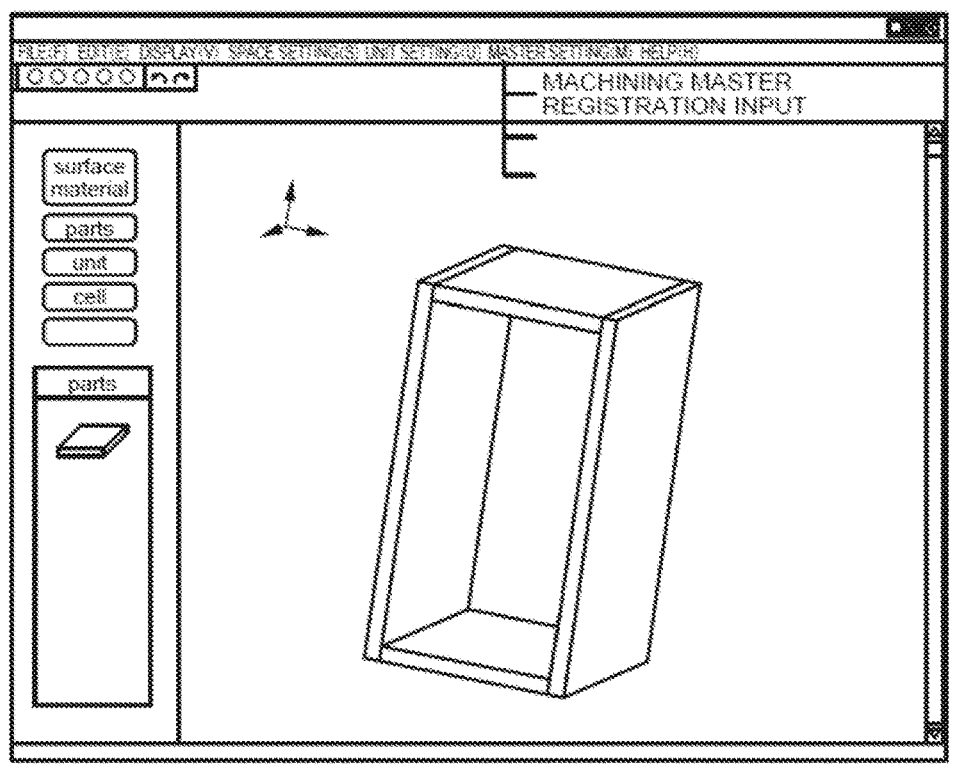
FIG. 5(A) shows the screen layout of the unit design system of the furniture design system according to an embodiment of the presently disclosed techniques.
Figure 5B:
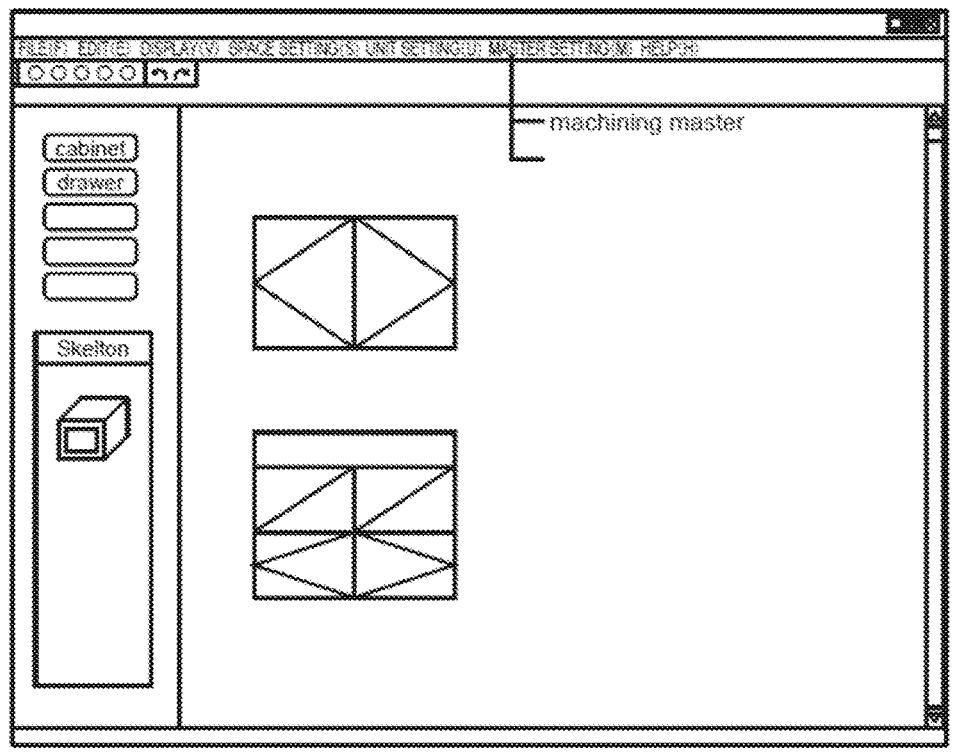
FIG. 5(B) shows a screen layout of the unit assembly system of the furniture design system according to an embodiment of the presently disclosed techniques.

FIG. 5(A) shows an example of a PC screen of a unit design system which is an embodiment of the presently disclosed techniques. FIG. 5(B) shows an example of a PC screen of a unit assembly system which is an embodiment of the presently disclosed techniques. When designing a furniture product on a PC screen of the system of the presently disclosed techniques, it is preferable that all the ridge lines of the members are set to be aligned in any direction of the XYZ coordinate axes in the PC screen. In the system of the presently disclosed techniques, since all members are designed as rectangular parallelepiped spaces, the three sides extending from one corner of the rectangular parallelepiped are set to extend in any one of the XYZ axes of the world coordinate on the PC screen.

A designer accesses the unit design system and inputs the information of dimensions of part members and combination part members of a furniture product. Further, the designer selects a machining registered in the machining master and registered the selected machining at a designated XY coordinate position on each face of the part member.

A person who designed a furniture product and place an order to a manufacturing plant by using the system of the presently disclosed techniques accesses the unit assembly system, read the unit produced by the unit design system in advance and registered in the memory, adjust the dimension of the unit, and design the product by assembling the units. Bill of materials (BOM) and machining specification (NC) of the part members that constitute the designed product are produced and transmitted to manufacturing factory 6 from manufacturing order unit 19.

Upon receiving data of a part member of the product designed by using the present system, the manufacturing factory 6 cuts a panel in accordance with the dimension of the part member. Referring to FIG. 18, the panel that has been cut in accordance with the dimension of the part member is placed on a machining table of the machining device such that a corner of the panel matches with the machine origin of the machining device.

The two-dimensional coordinate position of machining registered on the face of the designed part member is converted and calculated into the two-dimensional coordinate position of a corresponding face of the panel placed on the machining table. The machining device applies its tool to the two-dimensional coordinate position of the face of the panel that was calculated to be converted from the position of a face of a part member, and manufactures the part member by controlling the tool in accordance with the toolpath.

In order for the furniture manufacturer to manufacture the part member by receiving the design data of the part member, it is necessary to make settings other than the toolpath that is produced and registered in the machining master. For example, in an actual operation, when a furniture manufacturer has a plurality of NC machining devices, a part member may be machined by using machining device A today and another machining device B tomorrow. Such adjustments need to be performed on a side of furniture manufacturer. After these necessary settings are done, machining device may manufacture a designed part member.

Example (Bookshelf Design and Manufacturing)

Figure 16:
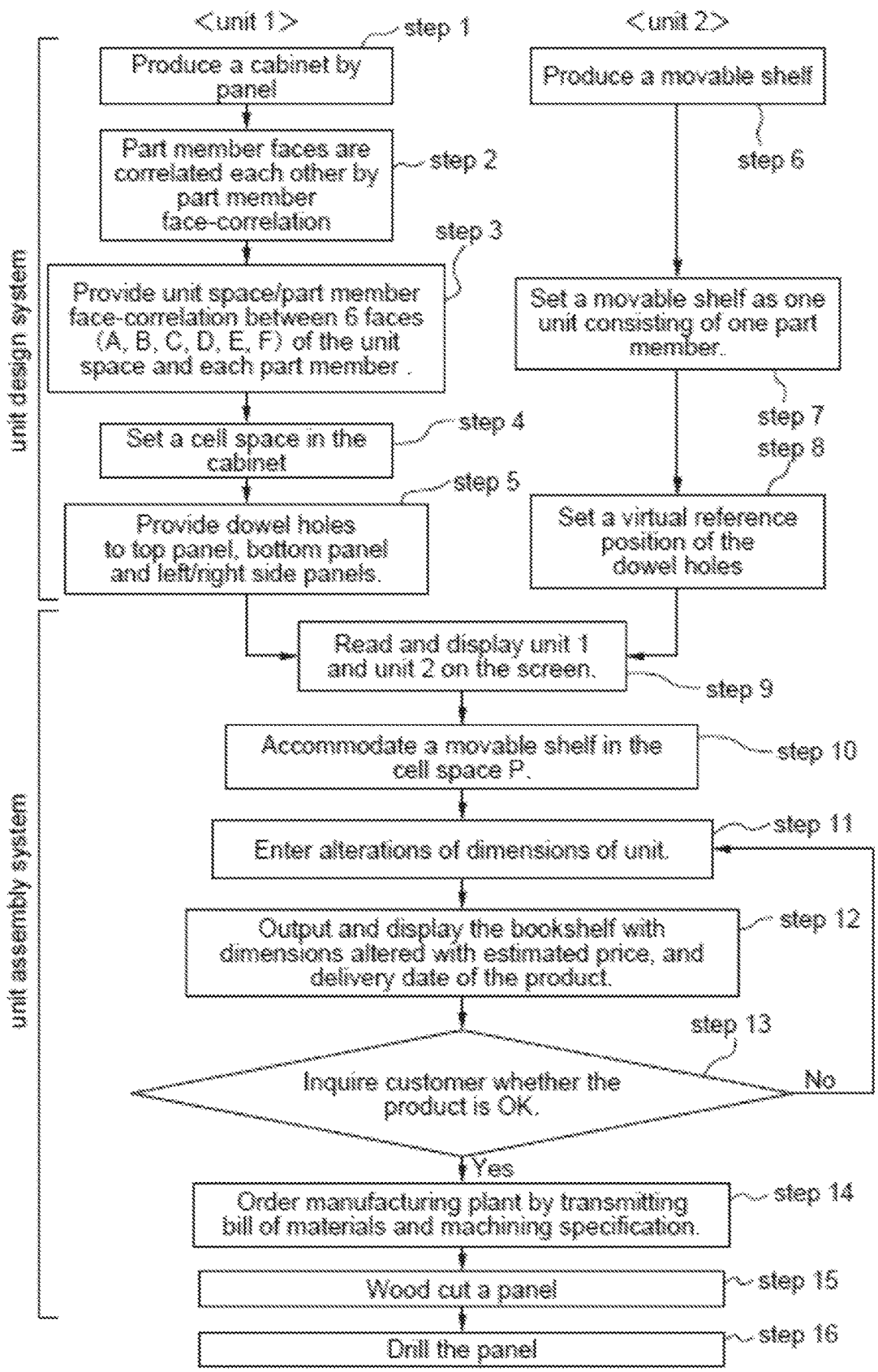
FIG. 16 shows a system flow of designing and manufacturing a furniture product by using the system of an embodiment of the presently disclosed techniques.

A method for manufacturing a bookshelf by designing and changing dimensions using a system of the presently disclosed techniques will be described with reference to the flowchart of FIG. 16 and related drawings as follows.

I. Designing a bookshelf
i) Units and part members
<Product configuration>

The bookshelf in FIG. 6 includes a cabinet 100 (unit 1) and a shelf panel 106 (unit 2). Cabinet 100 of unit 1 consists of five part members: right side panel 101, left side panel 102, back panel 103, top panel 104, and bottom panel 105. Unit 2 is a unit consisting of only one part member of shelf panel 106.)

ii) Produce a unit by using the unit design system
<Producing a Cabinet>

Step 1) Produce a cabinet by assembling panels.

By clicking an icon of the panel and reading the panel data, the panel stored in the memory is displayed on the screen having a temporary height, width and depth dimensions as a temporary sized panel (part member). The displayed panel (part member) is copied to produce the intended number of part members (5 in this example). Then, initial dimensions of the panel member (part member), distinction of variable value and fixed value, and setting of maximum/minimum value (optional) when dimensions are variable are entered. By dragging and moving each part member for which initial dimensions, variable/fixed, and maximum/minimum value settings (optional) have been entered on the screen, cabinet 100 is produced by assembling the part members such that each part member is aligned and arranged in the XYZ axis directions on the PC screen.

Figure 7A:
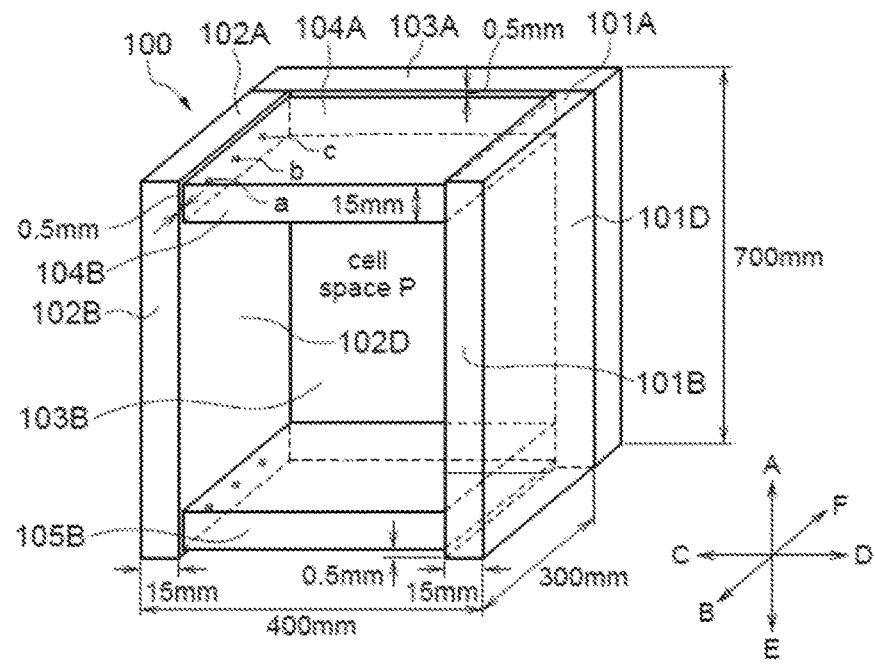
FIG. 7(A) shows the cabinet 100 of the bookshelf of FIG. 6.

Referring to FIG. 7(A), the cabinet 100 is composed of five part members (right side panel 101, left side panel 102, back panel 103, top panel 104, and bottom panel 105). The initial dimensions of the right side panel 101 and the left side panel 102 are 700 mm height (variable), 300 mm depth (variable), and 15 mm thickness (fixed). The initial dimensions of the top panel 104 and the bottom panel 105 are both: lateral length 370 mm (variable), depth 299.5 mm (variable), and thickness 15 mm (fixed). The initial dimensions of the back panel 103 are: lateral length 400 mm (variable) and height 700 mm (variable), thickness 15 mm (fixed).

Step 2) Provide part member faces correlation between part members.

First, the CPU automatically assigns identification numbers (symbols) to the six faces of each part member. Suppose that upper face is face A, front face is face B, left face is face C, right face is face D, and lower face is face E and back face is face F respectively, the identification numbers (codes) are assigned as 101A, 101B, 101C, 101D, 101E, 101F on the six faces of the right side panel 101, 102A, 102B, 102C, 102D, 102E, 102F on the six faces of the left side panel 102, 103A, 103B, 103C, 103D, 103E, 103F on the six faces of the back panel 103, 104A, 104B, 104C, 104D, 104E, 104F on the six faces of the top panel 104, and 105A, 105B 105C, 105D, 105E, 105F on the six faces of the bottom panel 105.

For example, as shown in FIG. 8, steps for providing the part member face-correlation start by using the left side panel 102 as a reference.

1. Right side face 102D of left side panel 102 and left side face 104C of top panel 104 are in parallel to each other and on the same plane.

2. Right side face 102D of left side panel 102 and left side face 105C of bottom panel 105 are in parallel to each other and on the same plane.

3. Left side face 102C of left side panel 102 and left side face 103C of back panel 103 are in parallel to each other and on the same plane.

4. Front face 102B of left side panel 102 and front face 101B of right side panel 101 are in parallel to each other and on the same plane.

5. Front face 102B of left side panel 102 and front face 104B of top panel 104 are in parallel to each other, and 102B is separated from 104B by 0.5 mm.

6. Front face 102B of left side panel 102 and front face 105B of bottom panel 105 are in parallel to each other, and 102B is separated from 105B by 0.5 mm.

7. Back face 102F of left side panel 102 and back face 101F of right side panel 101 are in parallel to each other and on the same plane.

8. Back face 102F of left side panel 102 and back face 104F of top panel 104 are in parallel to each other and on the same plane.

9. Back face 102F of the left side panel 102 and back face 105F of the bottom panel 105 are in parallel to each other and on the same plane.

10. Back face 102F of left side panel 102 and front face 103B of back panel 103 are in parallel to each other and on the same plane.

11. Upper face 102A of left side panel 102 and upper face 104A of top panel 104 are in parallel to each other, and 102A is separated from 104A by 0.5 mm.

12. Upper face 102A of left side panel 102 and upper face 101A of right side panel 101 are in parallel to each other and on the same plane.

13. Lower face 102E of left side panel 102 and lower face 105E of bottom panel 105 are in parallel to each other, and 102E is separated from 105E by 0.5 mm.

14. Lower face 102E of left side panel 102 and lower face 101E of right side panel 101 are in parallel to each other and on the same plane.

15. Upper face 102A of left side panel 102 and upper face 103A of back panel 103 are in parallel to each other and on the same plane.

16. Lower face 102E of left side panel 102 and lower face 103E of back panel 103 are in parallel to each other and on the same plane.

Because there are some part members that cannot be face-correlated with any of the face of the left side panel 102, the cabinet 100 cannot be completely defined only by the face-correlation based on the left side panel 102. Thus, after completing the face-correlation based on the left side panel 102, right side panel 101 is face-correlated with back panel 103, top panel 104 and bottom panel 105 as follows.

17. Left side face 101C of right side panel 101 and right side face 104D of top panel 104 are in parallel to each other and on the same plane.

18. Left side face 101C of right side panel 101 and right side face 105D of bottom panel 105 are in parallel to each other and on the same plane.

19. Right side face 101D of right side panel 101 and right side face 103D of back panel 103 are in parallel to each other and on the same plane.

FIG. 8 shows the part member face-correlation provided between the part members that constitute the cabinet 100. The cabinet 100 composed of the part members that are face-correlated each other in the above is defined as unit 1. Upon designing the unit 1, unit design system calculates a circumscribing rectangular parallelepiped space of the unit 1 as the unit space thereof.

Step 3) Providing unit space/part member face-correlation between six faces (A, B, C, D, E, and F) of the unit space of unit 1 and each part member constituting the unit 1 as follows.

1. Upper face (Face A) of the unit space is in parallel to upper face 102A of the left side panel 102 and the distance between the two faces is zero.
2. Lower face (Face E) of the unit space is in parallel to lower face 102E of left side panel 102 and the distance between the two faces is zero.
3. Left side face (Face C) of the unit space is in parallel to left side face 102C of left side panel 102 and the distance between the two faces is zero.
4. Right side face (Face D) of the unit space is in parallel to right side face 101D of right side panel 101 and the distance between the two faces is zero.
5. Front face (Face B) of the unit space is in parallel to front face 102B of left side panel 102 and the distance between the two faces is zero.
6. Back face (Face F) of the unit space is in parallel to back face 103F of back panel 103 and the distance between the two faces is zero.

The unit space/part member face-correlation provided between the unit space of unit 1 and each of the part members constituting the unit 1 is shown in FIG. 9.

Unit space/part member face-correlation is provided between a face of the part member constituting the unit 1 and a corresponding face of the unit space of unit 1 that is in parallel to the face of the part member. A face of each part member is directly or indirectly face-correlated by providing part member face-correlation with a corresponding face of another part member that is in parallel with the face of the part member. After providing unit space/part member face-correlation and part member face-correlation in this manner, if a face of the unit space of the unit 1 is moved by using the unit assembly system, the face of the part member constituting the unit 1 is moved accordingly, and then other part member that is part member face-correlated with the part member thus moved is moved accordingly.

In FIG. 7(A) and FIG. 8, neither right side panel 101E face nor left side panel 102E face is part member face-correlated with 104E face of top panel. Similarly, neither right side panel 101A face nor left side panel face 102A is part member face-correlated with 105A face of bottom panel. Because thickness of top panel 104 is set to be fixed and heights of right side panel 101, left side panel 102, and back panel 103 are set to be variable, right side panel face 101E, left side panel face 102E, right side panel face 101A and left side panel face 102A can be moved up and down. By moving these faces up and down, height of the cabinet 100 can be altered while thickness of the top panel 104 is not altered.

Step 4) Set a cell space in a cabinet

After the above-described face-correlations are completed, a cell space P is set in the interior space of cabinet 100.

Cell space P has face A, face B, face C, face D, face E, and face F according to the arrows in six directions shown in the lower right part of FIG. 7(A). Faces A, C, D, E, and F of cell space P face the faces 104E, 102D, 101C, 105A, and 103B of the cabinet 100. Since the front face of the cabinet 100 is open, there is no part member face facing to the Face B of the cell space P. By setting a cell space in the internal space of the cabinet 100, it becomes possible to accommodate the infill unit and to provide cell space/unit space face-correlation therebetween.

Step 5) Provide dowel holes to top panel, bottom panel and left/right side panels.

In order to connect and fix top panel 104 and the bottom panel 105 of the cabinet 100 to the left/right side panels 102 and 101 by using dowels, three cylindrical dowel holes having outer diameters of 6 mm and depth of 8 mm are provided on the left/right butt end faces of the top panel 104 and the bottom panel 105 respectively. By transferring the dowel holes provided on the butt end face of the top panel and bottom panel to the corresponding positions on the left/right side panels, dowel holes are provided on the inner face of the left/right side panels 102 and 101. When the position of the dowel hole is designated by the XY coordinate on the face of the part member by using the system which is an embodiment of the presently disclosed techniques, the center of the circle of the dowel hole can be the specific reference position.

Figure 7B:
FIG. 7(B) shows the position of the dowel holes on the face 104C of the top panel 104 of the cabinet 100 of FIG. 6(A).
Figure 7C:
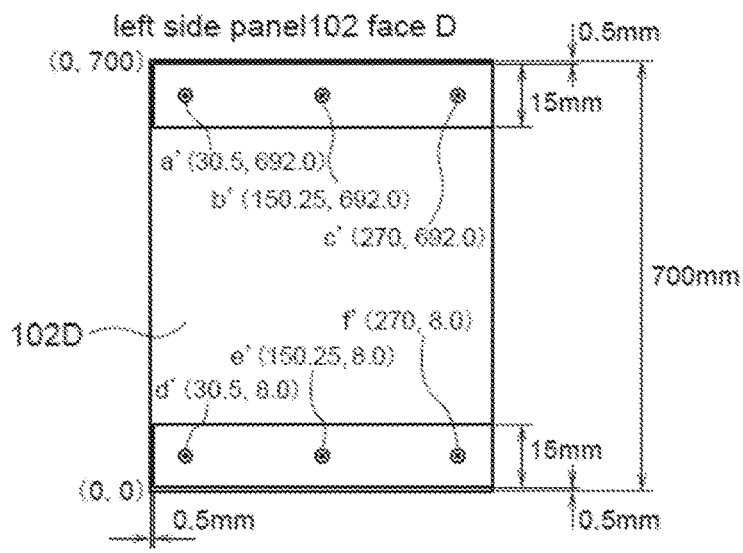
FIG. 7(C) shows the position of the dowel hole provided by transferring the dowel hole provided on the top panel face 104C of FIG. 7(B) to the face 102D using the XY coordinate of the face 102D.

FIG. 7(B) shows left butt end face 104C of the top panel 104 of the cabinet 100 of FIG. 7(A). FIG. 7(C) shows the positions of the three dowel holes in the XY coordinate on the face 102D when the face 104C is connected to left side panel face 102D. Top face of top panel 104 is provided with a step difference of 0.5 mm with respect to the top faces of the side panels 101 and 102, in which top face of top panel 104 is lowered by 0.5 mm. Similarly, the bottom face of bottom panel 105 has a step difference with respect to the bottom faces of the side panels 102 and 101, in which the bottom face of bottom panel 105 is raised by 0.5 mm. The top panel face 104B and the bottom panel 105B face are both retracted by 0.5 mm from the front face 102B and front face 101B of the respective left/right side panels 102 and 101.

Referring to FIG. 7(B), two-dimensional coordinate (local coordinate) is set on the rectangle of 104C such that left corner of the face 104C is set as the origin (0,0) and the two sides extending from the origin are set as x-axis and y-axis. As the rule for determining the position of dowel holes, three dowel holes a, b, and c are positioned such that hole a and hole c are provided at a position distanced from the but end of 104 panel by 30 mm in horizontal direction, and hole b is provided at a center position that bisects the horizontal length of 104C face in horizontal direction of the rectangle. As for the position in vertical direction of rectangle, holes a, b, c are positioned at the central position that bisects the vertical length of the rectangle (15 mm).

Depth of the top panel is 299.5 mm, which is 0.5 mm shorter than the side panel depth of 300 mm, and the thickness (fixed) of the top panel is 15 mm.

In the local two dimensional coordinate, in which lower left corner of the rectangle on the face 104C is the origin (0,0), the positions of the three dowel holes a, b, and c are a (30 mm, 7.5 mm), b (149.75 mm, 7.5 mm), and c (269.5 mm, 7.5 mm), respectively.

Next, referring to FIG. 7(C), dowel holes a, b, and c on the face 104C are perpendicularly projected on the left side panel face 102 (D) of the cabinet 100 to make a' b' and c' respectively. In the XY coordinate in which the lower left corner of the rectangle on the left side panel face 102D is set to be the origin (0,0), the positions of a' b' and c' are: a' (30.5 mm, 692.0 mm), b' (150.25 mm, 692.0 mm) and c' (270.0 mm, 692.0 mm) respectively.

Above is the same in the case of dowel holes which are provided on left butt end face 105C of bottom panel 105 and on left side face 102D of left side panel 102 that is connected to 102D face of left side panel by using dowels. Because the cabinet 100 has a symmetrical structure, the same applies to the top panel face 104D and the right panel face 101C, and also the bottom panel face 105D and the right panel face 101C as well.

<Produce Movable Shelf Panel>

Step 6) Produce movable shelf panel 106 (Unit 2).

A panel that is read by clicking the icon is displayed on a screen as a movable shelf panel 106. The initial dimensions of the movable shelf are set to be 369 mm lateral length (variable), 299.5 mm depth (variable), 15 mm thickness (fixed). The lateral length of the movable shelf is set to be 1 mm smaller than the width of the cabinet's cell space so that the movable shelf can be moved easily in the cabinet.

Step 7) Movable shelf panel 106 is set as unit 2 and unit/part member face correlation is provided between the unit space of unit 1 and the part member of the movable shelf panel 106. i.e. movable panel 106 is set as unit 2 which is composed of only one part member. The circumscribing rectangular parallelepiped space of unit 2 is set as a unit space of unit 2.

Step 8) Position the dowel holes on the dowels that support the shelf panel.

Figure 10A:
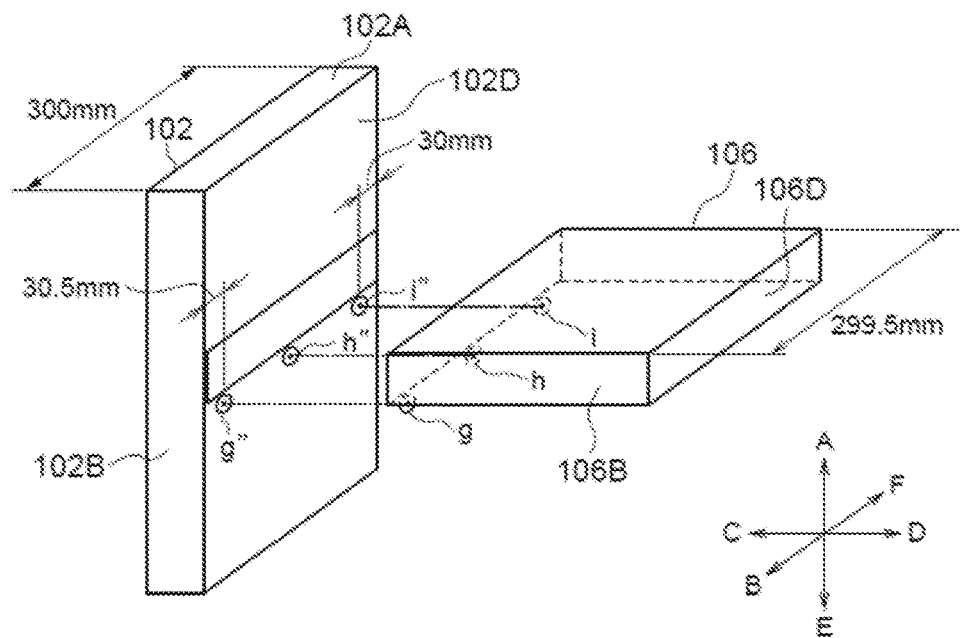
FIG. 10(A) shows an example in which a dowel hole machining is given to the left side panel 102 with reference to the position of the shelf panel 106 of FIG. 6.

Referring to FIGS. 10(A), (B), (C), three dowel holes are provided on the right side face 102D of the left side panel 102 to support the bottom of the movable shelf panel by using dowels. In order to make the movable shelf panel 106 movable up and down in the cabinet, it is necessary to set the position of the dowel holes provided on the left side panel face 102D to be movable corresponding to the height of the shelf panel 106. Therefore, the position of the dowel holes provided on the side panel face 102D is set with reference to the position of the butt end face 106C of the movable shelf panel 106. The position on the side panel face 102D that is specified by projecting the virtual reference position set with respect to the butt end face 106C of the shelf panel 106 in the direction perpendicular to the face 102D is the position of the dowel hole on the face 102D.

Figure 10B:
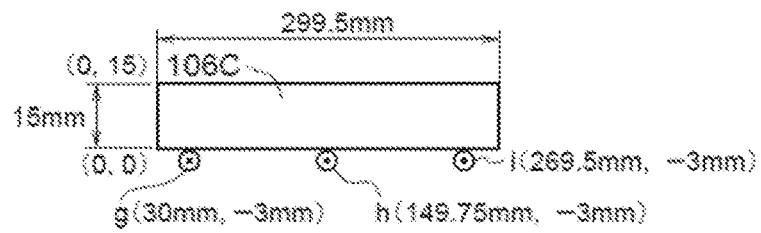
FIG. 10(B) shows a virtual reference position that is set using the XY coordinates of the shelf panel face 106C to give a dowel hole to the left side panel face 102D of FIG. 7(A).

Referring to FIG. 10(B), xy coordinate (local coordinate) is set such that the lower left corner of the rectangle on shelf face 106C is the origin. Reference positions g, h, and i for providing the dowel holes on the left side panel face 102D are specified by the xy coordinate that is set on the rectangle of the shelf panel face 106C. In the bookshelf of embodiment 1, initial dimensions of the movable shelf panel 106 are 299.5 mm depth and 15 mm thick, and outer diameter of the dowel hole is 6 mm. Therefore, the dowel hole reference positions g, h, and i are g (30 mm, −3 mm), h (149.75 mm, −3 mm), and i (269.5 mm, −3 mm) in order respectively from the left end of the rectangle of the shelf panel face 106C.

In FIG. 6, the shelf panel 106 is provided at a height position that bisects the length in the height direction of the left and right side panels, so the cabinet 100 is vertically symmetrical across the shelf panel 106. Therefore, the dowel hole setting between the top panel and the side panels can be copied to be provided between the bottom panel and the side panels. In addition, because the cabinet 100 accommodating the shelf panel 106 is laterally symmetrical, dowel holes (reference position) provided on a face of the shelf panel 106 and machining of the dowel holes to be provided to a side panel face can be copied to the opposite face.

3. Read out a unit designed by the unit design system and combine the units on the screen to produce a product.

Step 9) Display Units 1 and 2 on the screen.

Click the icon on the MENU screen of the unit assembly system, and read the unit of the desired type among the units designed in the unit design system and registered in the memory, and display it on the screen. Here, the unit of the cabinet is displayed as unit 1, and the unit composed of a part member constituting the shelf panel is displayed as unit 2.

Step 10) Accommodate the movable shelf panel (unit 2) in the cabinet (unit 1).

The movable shelf panel 106 is dragged to a desired height in the cell space P of the cabinet 100 shown in FIG. 6. In FIG. 6, the movable shelf panel 106 is initially set at the center of the right and left side panels in height direction.

The shelf panel 106 is accommodated in the cell space P surrounded by the side panels 101, 102, top panel 104, bottom panel 105, and back panel 103, which are part members of the cabinet 100. In the example of FIG. 6, at the position to which the shelf panel 106 is dragged, the surrounding four faces (face 106B, face 106C, face 106D, face 106F) of the shelf panel 106 are cell space/unit space face-correlated with corresponding four faces (face B, face C, face D, face F) of the cell space P with zero distance therebetween.

When the movable shelf panel 106 is accommodated in the cell space P, dowel holes for supporting the shelf panel are transferred to the inner face of the right and left side panels. As shown in FIG. 10(A), the lower face of the shelf panel 106 is supported by the dowels inserted into the three dowel holes provided in the left side panel, and therefore no dowel hole is provided on the butt end face of the shelf panel. The butt end face 106C of the shelf panel is provided with virtual reference positions for determining positions of the dowel holes to be provided on the face 102D of the left side panel, which is opposite to the butt end face 106.

Referring to FIG. 10(B), in xy coordinate (local coordinate) where the left lower corner of a rectangle of the face 106C is set as the origin, the reference positions g, h, i of the dowel holes of the face 106C of the shelf panel are g (30 mm, −0.3 mm), h (149.75 mm, −0.3 mm), and i (269.5 mm, −0.3 mm). Assume that g'', h'', i'' denote positions determined by perpendicularly projecting the positions g, h, i onto the right side face 102D of the left side panel 102 in the vertical direction to the face 106C. In this case, in the XY coordinate where the left lower corner of a rectangle of the right side panel is set as the origin, the coordinate positions of g'', h'', i'' are g'' (30.5 mm, 339.5 mm), h'' (150.25 mm, 339.5 mm) and i'' (270 mm, 339.5 mm) respectively.

When the shelf panel 106 is accommodated in the cell space P of the cabinet 100, the dowel machining input at positions g, h, and i specified with reference to the butt end face of shelf 106 is automatically transferred to the g'', h'', and i'' positions on right side face 102D of left side panel 102.

As the setting of the dowel holes on the shelf panel face 106C and the left side panel face 102D is the same (symmetrical) as that of the shelf panel face 106D and the right side panel face 101C which are the opposite faces, the machining applied to the shelf panel face 106D and the right side panel face 101C may be copied to the opposite face.

Step 11) Enter the unit dimension alteration.

Referring to FIGS. 6, 7, 8, and 9, an operation of changing the depth of the cabinet 100 (Unit 1) from 300 mm to 400 mm is explained.

When faces of the cabinet 100 are moved 100 mm in the depth direction (direction F) toward the back face (face F) of the unit space, since the thickness of the back panel 103 is fixed, and, referring to FIG. 8, both the face 102F and face 101F are part member face-correlated with the face 103B of the back panel with zero distance therebetween, both the face 102F of the left side panel 102 and the face 101F of the right side panel 101 move 100 mm in the depth direction (direction F). Since the depths of the left side panel 102 and the right side panel 101 are set to be changeable, the depths of the left side panel 102 and the right side panel 101 are increased by 100 mm to become 400 mm. Note that the face 102B and face 101B are not part member face-correlated with the face 103F and face 103B of the back panel, and therefore do not move in accordance with the movement of the face 103F and face 103B of the back panel in direction F caused by the movement of the back face (face F) of the unit space in direction F direction.

Figure 11:
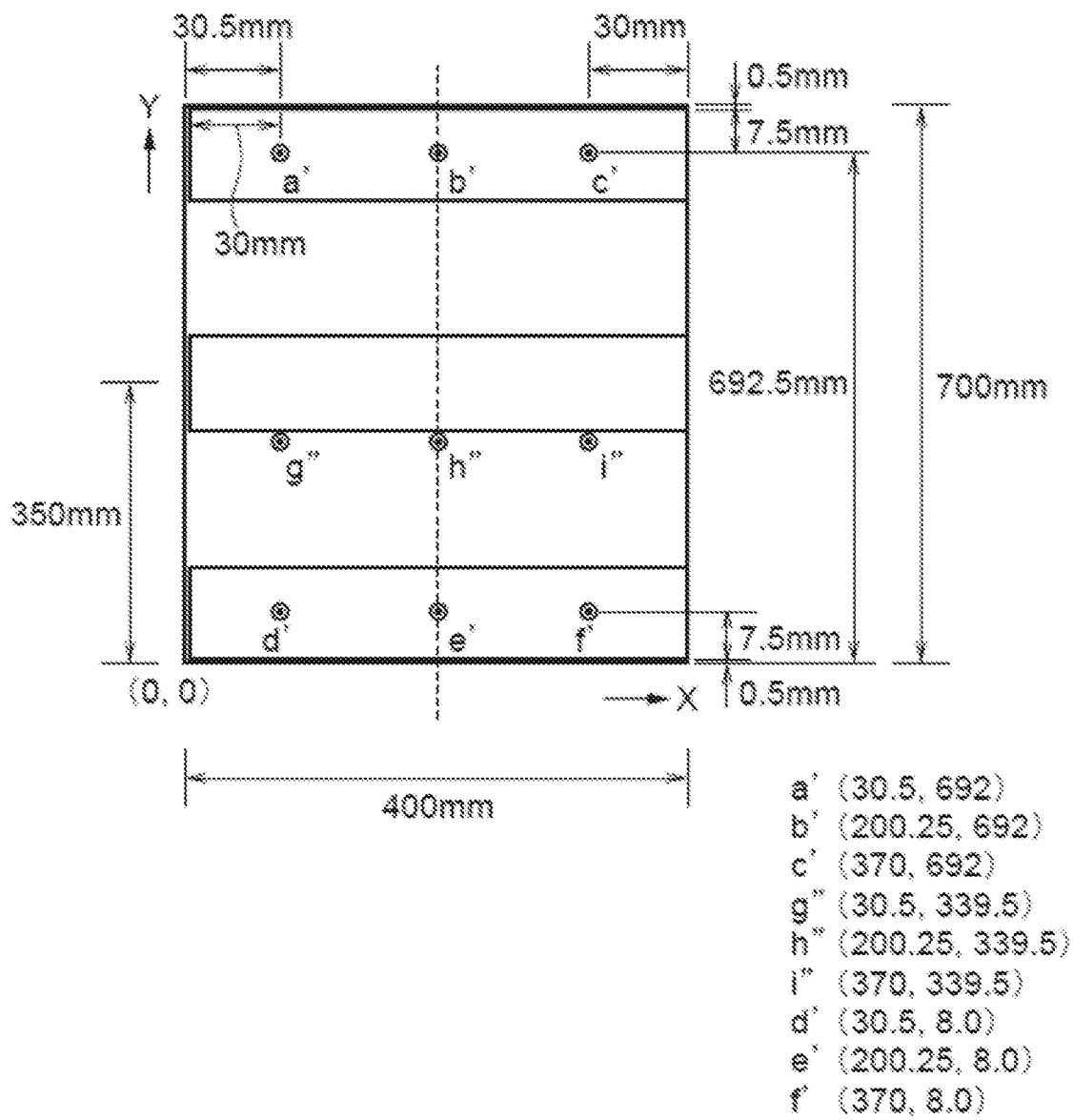
FIG. 11 shows a change of the position of the dowel hole as a result of an alteration of the depth dimension of the bookshelf of FIG. 6.

FIG. 11 shows the position of the dowel holes after altering the depth of the cabinet 100 from 300 mm to 400 mm.

Similarly, referring to FIGS. 6, 7, 8, and 9, an operation of lowering the height of the cabinet 100 (Unit 1) by 10 mm from 700 mm to 690 mm is explained.

In FIG. 9, since the upper face (face A) of the Unit 1 is unit/part face-correlated with the upper face 102A of the left side panel, if the height of the Unit 1 is set to 690 mm, the face 102A of the left side panel is accordingly moved 10 mm downward based on the relationship (zero distance between the faces) set by the face-correlation. Then, referring to FIG. 8, since the upper face 102A of the left side panel is face-correlated with and parallel to the upper face 104A of the top panel 104 with a 0.5 mm distance therebetween, the upper face 104A of the top panel 104 is lowered 10 mm downward while maintaining the 0.5 mm distance from the face 102A of the left side panel. Moreover, since the upper face 102A of the left side panel is face-correlated with the upper face 101A of the right side panel 101 and the upper face 103A of the back panel 103 with zero distance therebetween, movement of the upper face 102A of the left side panel 10 mm downward accordingly moves the face 101A of the right side panel and the face 103A of the back panel 10 mm downward. As a result, changing of the height of the Unit 1 to 690 mm reduces the height of all of the part members 101, 102, 103 by 10 mm, so that they all become 690 mm.

Figure 12:
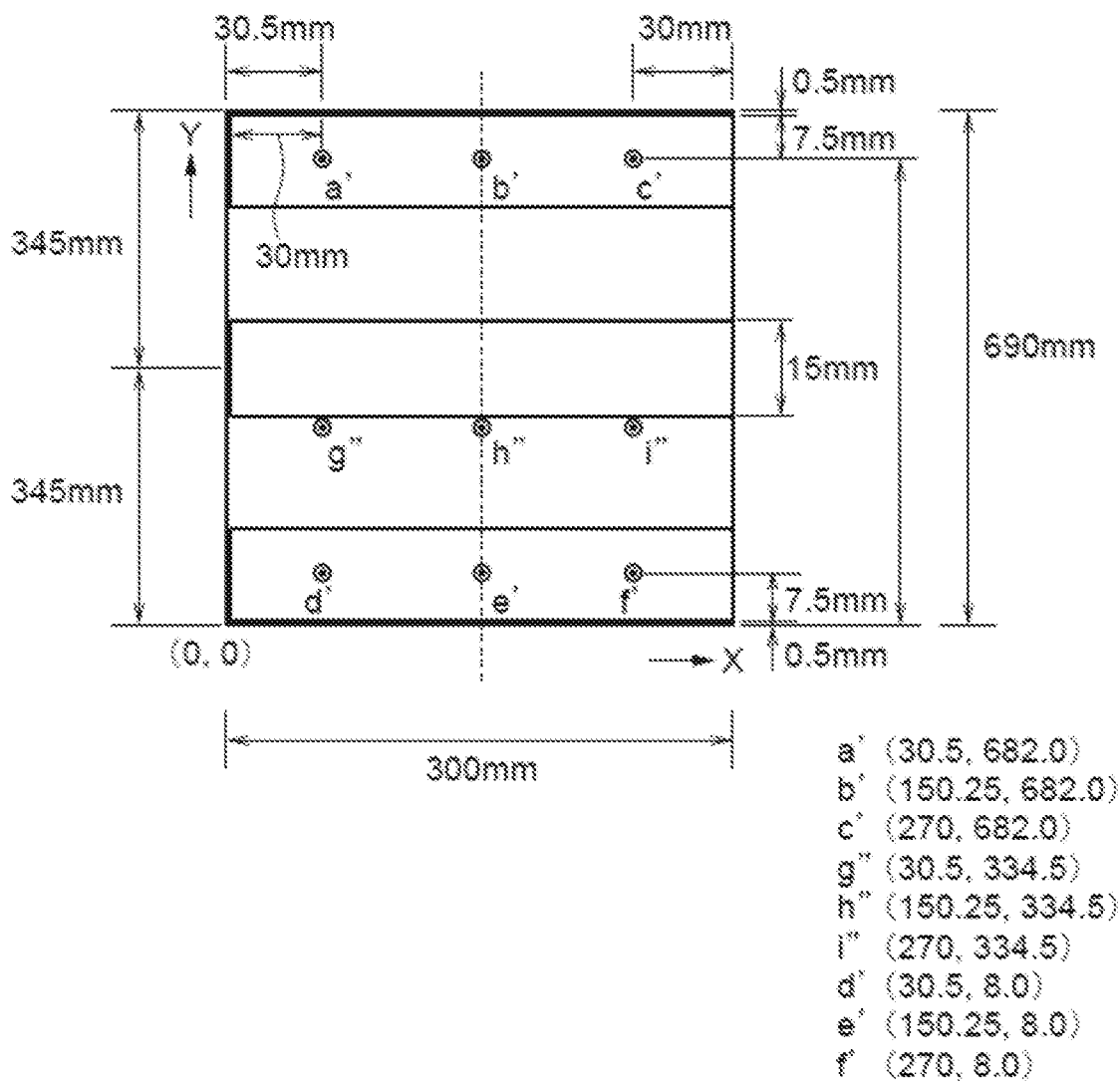
FIG. 12 shows a change of the position of the dowel hole as a result of an alteration of the height dimension of the bookshelf of FIG. 6.

FIG. 12 shows positions of the dowel holes after changing the height of the cabinet 100 from 700 mm to 690 mm. While FIG. 12 shows the settings of the positions of the dowel holes on the face 102D of the left side panel, the same applies to settings of the positions of dowel holes on the face 101C of the right side panel.

Further, referring to FIGS. 6, 7, 8, 9, and 10, an operation of lowering the position of the shelf panel 106 (Unit 2) accommodated in the cabinet 100 (Unit 1) by 10 mm is explained.

In FIG. 10, since the shelf panel 106 is provided at the center that bisects the height of the side panel, the lower face 106E of the shelf panel 106 is provided at a 342.5 mm (700 mm □ ½-7.5 mm) distance from both of the lower face 102E of the left side panel 102 and the lower face 101E of the right side panel 101.

While the shelf panel 106 as a part member constitutes the Unit 2, and has its surrounding four faces (face B, face C, face D, and face F) cell space/unit space face-correlated with the face B, face C, face D, and face F of the cell space P with zero distance therebetween, the distance between the upper face (face A) and the lower face (face E) of the shelf panel 106 is not fixed. Accordingly, the shelf panel 106 can move freely in the vertical direction, while following the cell space/unit space face-correlation set for its surrounding four faces.

Figure 10C:
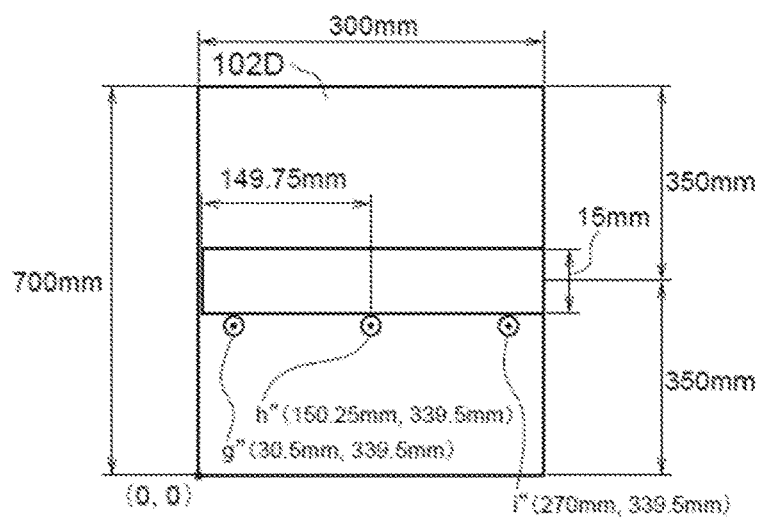
FIG. 10(C) shows the position of the dowel hole provided on the face 102D based on the virtual reference position that is set using the XY coordinate of the face 106C of shelf panel as shown in FIG. 7(B).

Assume that the bottom face 106E of the shelf panel 106 is lowered by 10 mm so that the distance between the bottom face 106E and the bottom face of the right side panel 101 is 332.5 mm. In this case, as shown in FIGS. 10(C) and 13, Y coordinate of the reference positions g, h, i of the face 106C is lowered 10 mm, whereby the Y coordinate of the machinings g", h", i" provided on the face 102D are lowered by 10 mm on the XY coordinate set on the face 102D.

Figure 13:
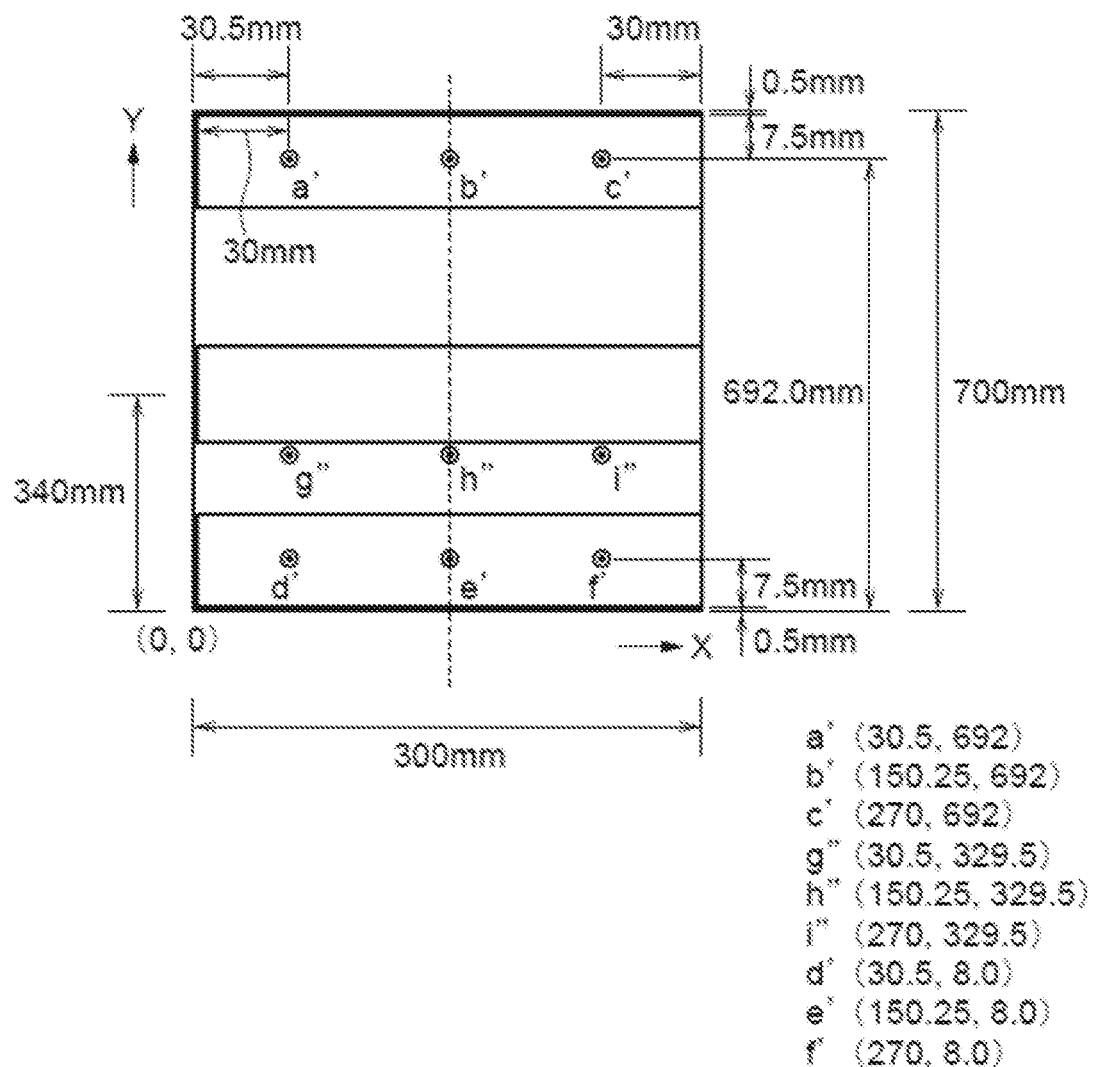
FIG. 13 shows a change in the position of the dowel hole as a result of an alteration of the position of movable panel of the bookshelf of FIG. 6.

FIG. 13 shows the position of the dowel holes after lowering the height of cabinet 100 shelf by 10 mm.

Step 13) Inquire customer to confirm whether the displayed product is OK.

Output and display the bookshelf having the dimensions altered by inputting the change to the unit, as a three-dimensional structure image on the PC screen. If the customer is satisfied with the specification and estimated cost and date of delivery of the product output on the screen, the customer confirms the purchase of the proposed furniture product. If the customer is not satisfied with the displayed specification, cost, or date of delivery and desires any change of them, the process returns to the input of the alteration in Step 11.

II. Manufacture a Bookshelf

4. Order production of the product.

Step 14) Send design data of a part member and element material of the part member of an ordered product (book shelf) having dimensions altered in response to a request from a customer to a furniture manufacturing plant through the furniture design system 1.

In the embodiment of the presently disclosed techniques, for each of the bottom panel, top panel, left side panel, right side panel, back panel and shelf panel that constitute a bookshelf 1 whose height is lowered by 10 mm, (i) bill of materials (BOM) and (ii) machining specification (NC) are produced and sent to the machining device of the manufacturing factory. Further, for each of the core component, butt end face sheet, surface sheet, and dowels, which are the element materials constituting the shelf panel, bill of materials (BOM) is produced and sent to the machining device (i) Bill of Materials (BOM)

FIG. 14 shows bill of materials (BOM) of each part member (left side panel 102, right side panel 101, top panel 104, bottom panel 105, back panel 103, and shelf panel 106) and core component, surface sheet, butt end sheet and dowel 107 constituting the shelf panel 106, when the height of the bookshelf 100 designed using the system of the present embodiment is lowered by 10 mm.

(ii) Machining Specification (NC)

FIGS. 15(A), (B) and (C) show machining specification of the dowel holes that are provided to the face 102D of the left side panel 102 constituting the bookshelf designed using the system of the embodiment. FIG. 15(A) shows machining specification of the dowel holes provided to the left side panel face 102D of the initial dimension of the bookshelf 100. FIG. 15(B) shows machining specification of the dowel hole provided to the left side panel face 102D when the height of the bookshelf 100 is lowered by 10 mm.

FIG. 15(C) shows the machining specification of the dowel hole provided to the left side panel face 102D, when the position of the shelf panel 106 is lowered by 10 mm without changing the depth and height of the bookshelf 100. The process of providing the machining of dowel holes by the machining device in accordance with the machining specification of the dowel hole provided to the left side panel face 102D when the height of the bookshelf 100 of 15(B) is lowered by 10 mm is explained as follows.

5. Produce part members by using a machining device.

Step 15) The manufacturing factory receives the bill of materials (FIG. 14) of the bookshelf 100 whose height dimension is lowered by 10 mm, and produce each panel of the bookshelf 100 having the same dimensions as that of the designed part members by wood cutting. Place the panel produced by wood cutting on the machining table of a 3-axis NC machinery so that origin of three-dimensional local coordinate of the rectangular parallelepiped space of the part member 102 matches with the machine origin (X0, Y0, Z0) of the machining device.

Step 16) Provide machining of dowel holes at predetermined positions on the panel placed on the machining table.

In FIG. 15(B), the left side panel 102 is made of solid wood, and its dimensions are designed to be 300 mm in length, 690 mm in width, and 15 mm in thickness. On the left side panel face 102D, round dowel holes with 6 mm diameter and 8 mm depth are registered at the following positions: a' (30.5 mm, 682 mm), b' (150.25 mm, 682 mm), c' (270 mm, 682 mm), g" (30.5 mm, 334.5 mm), h" (150.25 mm, 334.5 mm), i" (270 mm, 334.5 mm), d' (30.5 mm, 8.0 mm), e' (150.25 mm, 8.0 mm), and f' (270 mm, 8 mm).

Upon receiving the design data of the part member 102 having altered dimensions, the NC machine converts the design data of machining position with reference to the origin of local coordinate of the rectangular parallelepiped space to a coordinate position of the device with reference to the machine origin of the NC machine based on the relationship between the origin of local coordinate of the rectangular parallelepiped space of part member 102 and machine origin of the NC machine.

The NC machinery controls the tool based on the converted machine coordinate position data, and applies a cutting machining on the coordinate position of the face of the panel placed on the machining table to form a dowel hole.

For other part members constituting the bookshelf 100, i.e. left side panel 101, back panel 103, top panel 104, bottom panel 106, and shelf panel 106, machining that are designed by using the designing system are provided to the panels in the same manner, and those panels are assembled to produce the bookshelf 100.

If the machining device is equipped with a drill of 6 mm diameter the drill can be placed on the position (30.5 mm, 692.0 mm) of the left side panel face 102D and lower the rotating drill at that position so that a round hole of 8 mm depth and 6 mm diameter is created by cutting. If the machining device is not equipped with a 6 mm diameter drill and only equipped with a 2 mm diameter drill, a circular hole having 6 mm diameter can be created by moving the 2 mm diameter drill along the circumference of the 6 mm diameter circular hole. In this case, it is necessary to produce a toolpath in advance for this operation of the tool using CAM on the machining device side.

In above embodiments, the product(s) have been described with respect to a furniture product having the simplest structure for the convenience of explanation of the presently disclosed techniques. The presently disclosed techniques can be applied to a furniture product having more complex structure. The presently disclosed invention may be suitably used for the design and manufacture of a furniture product. However, its application is not limited to furniture, but may also be widely used for the design and manufacture of three-dimensional structures consisting of multiple components.

Effect of the Invention

As described above, in the system and method of manufacturing a part member of a furniture product designed by using a computer according to the presently disclosed techniques, a furniture product is designed as a combination of rectangular parallelepiped spaces in which machining of holes, grooves, notches, etc. are registered on a face of a rectangular parallelepiped space. Under this setting, by altering the dimensions of the rectangular parallelepiped, the machining position can be altered accordingly.

The machining registered on the face of the part member space is selected from a plurality of kinds of machining that are registered in the machining master. Therefore, as long as the machining registered in the machining master can be implemented to a panel, any machining device can be used. Further, shape/dimension of machining is registered in the machining master. And tools and other methods of machining are not registered in the machining master. Those are left to the decision of the machine side. Thus, the machining device can freely manufacture the ordered parts using the tools and other equipment with which the machining device is equipped.

The system/method of the presently disclosed techniques is not limited to the case where a dimension of part members of a furniture product is altered according to customer's request. Present invention may also be applied for the case where the originally designed part member is manufactured by a machining device without changing the dimensions.

The invention claimed is:

1. A method for altering a dimension of a part member of a furniture product designed by using a computer and manufacturing the part member by using a machining machine, comprising:

producing and displaying the part member having a predetermined initial dimension on a computer screen as a rectangular parallelepiped space, and assigning an identification number to each of six faces of the rectangular parallelepiped space of the part member;

setting a local three-dimensional coordinate for the rectangular parallelepiped space, a corner of which is set as an origin of the local three-dimensional coordinate, and setting a local two-dimensional coordinate on a rectangle face of the six faces of the rectangular parallelepiped space, a corner of which is set as an origin of the local two-dimensional coordinate, and two sides of the rectangle face that perpendicularly extend from the origin are set as X-axis and Y-axis;

calculating a position of a machining that is applied to each of the six faces of the part member in accordance with a predetermined rule based on dimensions of the rectangular parallelepiped space, and designating the position of the machining by using the local two-dimensional coordinate that is set for each of the six faces of the rectangular parallelepiped space;

selecting a machining from a plurality of types of machinings registered in machining master data stored in a memory, and registering the selected machining at a position on a face of the rectangular parallelepiped space, which the identification number in the rectangular parallelepiped space is assigned, that is designated by using the local two-dimensional coordinate of the rectangle face;

altering the dimensions of the rectangular parallelepiped space of the part member upon a request from a customer, and thereby altering a local two-dimensional coordinate position of the machining registered on the face of the rectangular parallelepiped space, to which the identification number in the rectangular parallelepiped space is assigned, in accordance with the predetermined rule; and transmitting the selected machining registered on a face of the altered rectangular parallelepiped space to a computer aided manufacturing (CAM) system of the machining machine together with the identification number of the face of the rectangular parallelepiped space, wherein a toolpath is prepared in advance by the CAM of the machining machine for the machining registered in the machining master data so that the machining is provided on a face of a panel that is machined by using a tool of the machining machine, the panel being machined to produce the part member, wherein the machining is provided on the face of the panel by placing the panel having the dimensions of the rectangular parallelepiped space on a machining table of the machining machine such that a corner of the panel matches with a machine origin of the machining machine, and wherein the two-dimensional position of the machining registered on the face of the rectangular parallelepiped space is converted into a two-dimensional position of the face of the panel so that the tool of the machining machine is applied to the face of the panel in accordance with the toolpath.

2. The method of claim 1, wherein the plurality of types of machinings registered in the machining master data include a drilling with a specific diameter, a grooving with a specific width and length, and a notching with a specific vertical and lateral length.

3. The method of claim 1, wherein two or more types of machinings are selected from the plurality of types of machinings registered in the machining master data, and each machining is entered in the position designated by the local two-dimensional coordinates of the face of the rectangular parallelepiped space.

4. The method of claim 1, wherein the plurality of types of machinings registered in the machining master data include a round hole machining, and a position for registering the round hole machining on the face of the rectangular parallelepiped space is determined by setting a center of a circle of the round hole as a specific reference position.

5. The method of claim 1, wherein the plurality of types of machinings registered in the machining master data include a grooving machining, and the position of the grooving machining on the face of the rectangular parallelepiped space of the part member is determined by setting an end of a groove as a specific reference position.

6. The method of claim 2, wherein two or more types of machinings are selected from the plurality of types of machinings registered in the machining master data, and each machining is entered in the position designated by the local two-dimensional coordinates of the face of the rectangular parallelepiped space.

7. The method of claim 2, wherein the plurality of types of machinings registered in the machining master data include a round hole machining, and the position for registering the round hole machining on the face of the rectangular parallelepiped space is determined by setting a center of a circle of the round hole as a specific reference position.

8. The method of claim 3, wherein the plurality of types of machinings registered in the machining master data include a round hole machining, and a position for registering the round hole machining on the face of the rectangular parallelepiped space is determined by setting a center of a circle of the round hole as a specific reference position.

9. The method of claim 2, wherein the plurality of types of machinings registered in the machining master data include a grooving machining, and a position of a grooving machining on the face of the rectangular parallelepiped space of the part member is determined by setting an end of a groove as a specific reference position.

* * * * *